(12) United States Patent
Goto et al.

(10) Patent No.: US 12,512,899 B2
(45) Date of Patent: Dec. 30, 2025

(54) WIRELESS COMMUNICATION SYSTEM, RELAY APPARATUS, WIRELESS COMMUNICATION METHOD AND PROGRAM

(71) Applicant: NTT, Inc., Tokyo (JP)

(72) Inventors: Daisuke Goto, Musashino (JP); Kiyohiko Itokawa, Musashino (JP); Yasuyoshi Kojima, Musashino (JP); Kazumitsu Sakamoto, Musashino (JP)

(73) Assignee: NTT, Inc., Tokyo (JP)

( * ) Notice: Subject to any disclaimer, the term of this patent is extended or adjusted under 35 U.S.C. 154(b) by 308 days.

(21) Appl. No.: 18/267,486

(22) PCT Filed: Dec. 23, 2020

(86) PCT No.: PCT/JP2020/048234
§ 371 (c)(1),
(2) Date: Jun. 15, 2023

(87) PCT Pub. No.: WO2022/137397
PCT Pub. Date: Jun. 30, 2022

(65) Prior Publication Data
US 2024/0048224 A1  Feb. 8, 2024

(51) Int. Cl.
*H04B 7/185* (2006.01)
(52) U.S. Cl.
CPC .................. *H04B 7/185* (2013.01)
(58) Field of Classification Search
CPC ..................................................... H04B 7/185
USPC ........................................................ 370/329
See application file for complete search history.

(56) References Cited

U.S. PATENT DOCUMENTS

| | | | |
|---|---|---|---|
| 2020/0028581 A1* | 1/2020 | Gaske | H04B 7/18563 |
| 2020/0045564 A1* | 2/2020 | Yun | H04B 7/2606 |
| 2022/0345201 A1* | 10/2022 | Nishimoto | H04W 40/248 |

(Continued)

FOREIGN PATENT DOCUMENTS

| | | |
|---|---|---|
| JP | H07321721 A | 12/1995 |
| JP | 2013012976 A | 1/2013 |

OTHER PUBLICATIONS

Daichi Kominami et al., "Self-organized transmission scheduling for LPWA networks considering gateway load balancing", The Institute of Electronics, Information and Communication Engineers, Technical Report of IEICE. vol. 117, No. 353, IN2017-67, pp. 127-132, Dec. 2017.

*Primary Examiner* — Robert J Lopata

(57) ABSTRACT

A wireless communication system includes: one or more first communication devices located in one or more small areas among a plurality of small areas into which a communication target area is divided; a relay device; and a second communication device, in which the relay device includes: an antenna drive unit that drives one or more antennas to scan the plurality of small areas with one or more beams while emitting the beams to the communication target area, the beams each having an emission range narrower than the communication target area; a reception unit that acquires, from the antennas, a first wireless signal transmitted from the first communication devices located in the emission range; and a transmission unit that transmits a second wireless signal depending on the first wireless signal to the second communication device.

5 Claims, 18 Drawing Sheets

(56) References Cited

U.S. PATENT DOCUMENTS

| | | | |
|---|---|---|---|
| 2023/0170988 A1* | 6/2023 | Goto | H04B 7/18504 370/316 |
| 2024/0214033 A1* | 6/2024 | Sakamoto | H04B 7/185 |

* cited by examiner

WIRELESS COMMUNICATION SYSTEM, RELAY APPARATUS, WIRELESS COMMUNICATION METHOD AND PROGRAM

CROSS-REFERENCE TO RELATED APPLICATIONS

This application is a 371 National Stage of International Application No. PCT/JP2020/048234, filed on Dec. 23, 2020. The entire disclosure of the above application is incorporated herein by reference.

TECHNICAL FIELD

The present invention relates to a wireless communication system, a relay apparatus, a wireless communication method, and a program.

BACKGROUND ART

An Internet of Things (IoT) system has become widespread that implements various applications by connecting a small terminal device to the Internet. As an application example of the IoT system, a system is known in which a plurality of IoT terminals senses environmental information such as air temperature, room temperature, acceleration, and luminous intensity and transmits the information by a wireless signal, and a cloud side collects the environmental information. The IoT terminals including various sensors are installed in various places. It is also assumed that IoT is utilized to collect data from places where it is difficult to install base stations (for example, buoys and ships on the sea, and mountainous areas).

On the other hand, there is a wireless system that performs wireless communication between a plurality of communication devices on the ground and a relay station using a communication satellite, an unmanned aerial vehicle (UAV), or the like as the relay station. As the wireless system using the communication satellite as the relay station, there are a case where a low earth orbit satellite (LEO) is used orbiting in a low orbit at an altitude of about 1,000 km, and a case where a geostationary orbit satellite (GEO) is used orbiting at an altitude of 36,000 km. In the low earth orbit satellite, a propagation distance of a signal is shorter than that of the geostationary orbit satellite. For that reason, in a case where the low earth orbit satellite is used as the relay station, it is possible to implement communication with low delay and low propagation loss. In addition, in this case, a configuration of a high frequency circuit included in the low earth orbit satellite or the communication devices on the ground becomes simple. However, since the low earth orbit satellite orbits above the earth unlike the geostationary orbit satellite, a direction changes at all times in which the low earth orbit satellite is viewed from the communication device on the ground. A time per orbit for which the low earth orbit satellite is visible is several minutes in each communication device on the ground. For that reason, a time zone is limited in which the low earth orbit satellite and each communication device on the ground can communicate with each other.

On the other hand, Low Power Wide Area (LPWA) is known as a wireless system capable of wide area communication at low power and a low transmission rate suitable for communication of IoT terminals. Recently, a satellite IoT system has been studied including a communication satellite that collects data from an IoT terminal using LPWA. In general, a propagation distance of a wireless signal of communication between a communication satellite and a communication device on the ground is longer than that of wireless communication in which a plurality of communication devices on the ground directly communicates with each other. In addition, LPWA can be applied by using a low earth orbit satellite. In the case of such a satellite IoT system, accommodation (for example, accommodation of IoT terminals in the aeronautical field, the marine field, and the rural area) becomes possible, which has been difficult only with normal LPWA. In this case, since a hub station is not required, service deployment is facilitated.

In addition, recently, the number of IoT terminals has been increasing. In addition, since LPWA has a low data rate, a time during which the IoT terminal transmits data becomes relatively long. For that reason, as the number of IoT terminals increases, there is a concern about an increase in opportunities for collision between data packets. On the other hand, for example, Non Patent Document 1 describes a method of avoiding collision at the time of data reception in a base station by autonomous and distributed transmission schedule control of terminals in an LPWA network. In the method described in Non Patent Document 1, a transmission timing of each terminal is expressed by a phase oscillator model. Each terminal transmits data after waiting for the phase of the terminal to become 0. In the method, data collision is avoided by implementing an anti-phase synchronization state where the phases of all terminals are placed at regular intervals.

CITATION LIST

Non Patent Document

Non Patent Document 1: Daichi Kominami, Ikkyu Aihara, Masayuki Murata, "Self-organized transmission scheduling for LPWA networks considering gateway load balancing", Technical Report of the Institute of Electronics, Information and Communication Engineers (TETCE Technical Report), vol. 117 no. 353 IN2017-67, pp. 127-132, December 2017

SUMMARY OF INVENTION

Technical Problem

In the IoT system, a relay station emits a beam into a communication target area, thereby receiving terminal uplink signals from IoT terminals located in an emission range of the beam. To ensure reliability of such communication, the IoT terminals may repeat data transmission to a base station a plurality of times. That is, many terminal uplink signals may be transmitted from the IoT terminals. In addition, since a large number of the IoT terminals transmit data, transmission opportunities exceeding the number of slots may occur. As described above, in the IoT system, a congestion degree of communication may fluctuate.

However, in the method described in Non Patent Document 1, the IoT terminals simply and uniformly transmit terminal uplink signals at different timings given to the respective IoT terminals. In addition, the method does not control a transmission schedule depending on an occupancy state of the base station. For that reason, in the method described in Non Patent Document 1, in a case where the congestion degree of communication fluctuates, data collision may occur, and the reliability of communication may be decreased.

Thus, there is a method of narrowing the diameter of a beam emitted from a satellite in a communication target area in which the IoT terminals are arranged, by beamforming and making the emission range of the beam into a spot, thereby reducing the number of IoT terminals that can communicate at the same time. As a result, it is possible to suppress a decrease in the reliability of communication by making it difficult to cause a collision of data transmitted from the IoT terminals. However, as the emission range of the beam is made into a spot, it becomes difficult to implement wide coverage. To implement wide coverage, it is necessary to increase the number of beams to cover the entire communication target area, but there is a problem that cost increases because a large number of antenna elements are required depending on the number of beams.

In view of the above circumstances, an object of the present invention is to provide a wireless communication system, a relay device, a wireless communication method, and a program capable of implementing wide coverage without increasing the number of beams more than necessary.

Solution to Problem

One aspect of the present invention is a wireless communication system including: one or more first communication devices located in one or more small areas among a plurality of small areas into which a communication target area is divided; a relay device; and a second communication device, in which the relay device includes: an antenna drive unit that drives one or more antennas to scan the plurality of small areas with one or more beams while emitting the beams to the communication target area, the beams each having an emission range narrower than the communication target area; a reception unit that acquires, from the antennas, a first wireless signal transmitted from the first communication devices located in the emission range; and a transmission unit that transmits a second wireless signal depending on the first wireless signal to the second communication device.

In addition, one aspect of the present invention is a relay device in a wireless communication system including one or more first communication devices located in one or more small areas among a plurality of small areas into which a communication target area is divided, a second communication device, and the relay device that is movable, the relay device including: an antenna drive unit that drives one or more antennas to scan the plurality of small areas with one or more beams while emitting the beams to the communication target area, the beams each having an emission range narrower than the communication target area; a reception unit that acquires, from the antennas, a first wireless signal transmitted from the first communication devices located in the emission range; and a transmission unit that transmits a second wireless signal depending on the first wireless signal to the second communication device.

In addition, one aspect of the present invention is a wireless communication method executed by a wireless communication system including: one or more first communication devices located in one or more small areas among a plurality of small areas into which a communication target area is divided; a relay device; and a second communication device, the wireless communication method including, by the relay device: driving one or more antennas to scan the plurality of small areas with one or more beams while emitting the beams to the communication target area, the beams each having an emission range narrower than the communication target area; acquiring, from the antennas, a first wireless signal transmitted from the first communication devices located in the emission range; and transmitting a second wireless signal depending on the first wireless signal to the second communication device.

In addition, one aspect of the present invention is a program for causing a computer to function as the relay device of the wireless communication system.

Advantageous Effects of Invention

According to the present invention, it is possible to implement wide coverage without increasing the number of beams more than necessary.

DESCRIPTION OF EMBODIMENTS

Hereinafter, embodiments of the present invention will be described in detail with reference to the drawings.

First Embodiment

Figure 1:
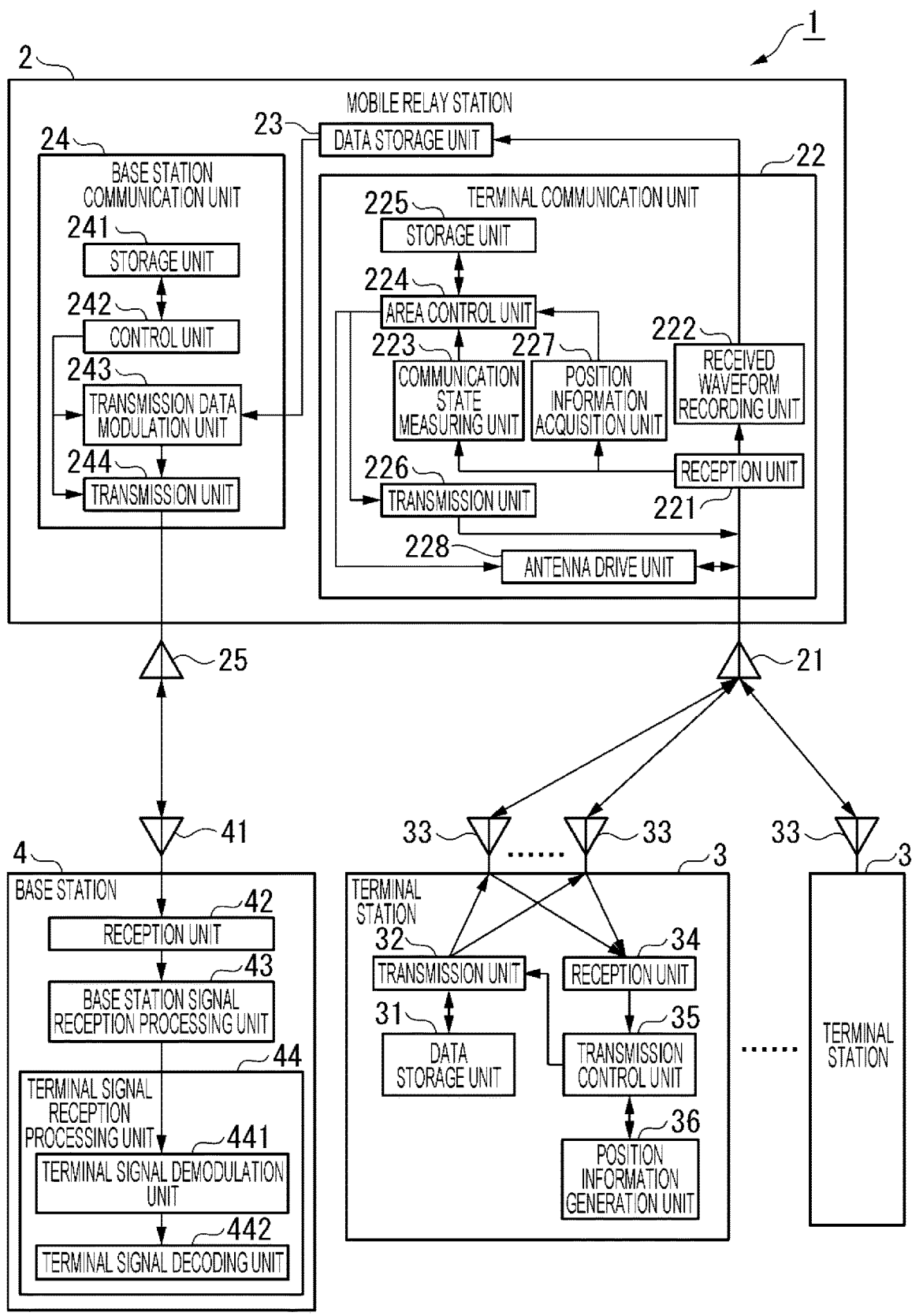
FIG. 1 is a configuration diagram of a wireless communication system according to a first embodiment of the present invention.

FIG. 1 is a configuration diagram of a wireless communication system 1 according to a first embodiment of the present invention. The wireless communication system 1 includes a mobile relay station 2, a terminal station 3, and a base station 4. The number of mobile relay stations 2, the number of terminal stations 3, and the number of base stations 4 included in the wireless communication system 1 are arbitrary, but it is assumed that the number of terminal stations 3 is large. The wireless communication system 1 is a communication system that transmits information for which immediacy is not required. Pieces of information respectively transmitted from a plurality of the terminal stations 3 are transmitted via the mobile relay station 2 and collected by the base station 4.

The mobile relay station 2 is an example of a relay device that is mounted on a mobile body and whose communicable area moves with a lapse of time. The mobile relay station 2 is included in, for example, a low earth orbit (LEO) satellite. The altitude of the LEO satellite is less than or equal to 2000 km, and the LEO satellite orbits above the earth once in about 1.5 hours. The terminal station 3 and the base station 4 are installed on the earth such as on the ground or on the sea. The plurality of terminal stations 3 exists at different places. The terminal station 3 is, for example, an IoT terminal. The terminal station 3 collects data such as environmental data detected by a sensor and transmits the collected data to the mobile relay station 2 by a wireless signal. In the figure, only two terminal stations 3 are illustrated. The mobile relay station 2 receives data transmitted from each of the plurality of terminal stations 3 by a wireless signal while moving above the earth. The mobile relay station 2 accumulates the received data and wirelessly transmits the accumulated data collectively to the base station 4 at a timing at which communication with the base station 4 is possible. The base station 4 receives the data collected by the terminal stations 3 from the mobile relay station 2.

As the mobile relay station 2, it is conceivable to use a relay station mounted on a geostationary orbit satellite or an unmanned aerial vehicle such as a drone, or a high altitude platform station (HAPS). However, in the case of a relay station mounted on a geostationary orbit satellite, although the coverage area (footprint) on the ground is wide, the link budget for an IoT terminal installed on the ground is very small due to the high altitude. On the other hand, in the case of a relay station mounted on a drone or a HAPS, although the link budget is high, the coverage area is narrow. Further, the drone requires a battery and the HAPS requires a solar panel. In the present embodiment, as an example, the mobile relay station 2 is mounted on an LEO satellite. Thus, in addition to the link budget remaining within a limit, the LEO satellite has no air resistance and low fuel consumption because it orbits outside the atmosphere. In addition, the footprint is also larger than that in a case where a relay station is mounted on a drone or a HAPS.

Since the mobile relay station 2 mounted on the LEO satellite performs communication while moving at high speed, a time during which each of the terminal stations 3 or the base station 4 can communicate with the mobile relay station 2 is limited. Specifically, in a case where the terminal station 3 views the mobile relay station 2 from the ground, the mobile relay station 2 passes over the sky in about 10 minutes. In addition, wireless communication schemes of various specifications are used for the terminal station 3. Thus, the mobile relay station 2 during movement receives a terminal uplink signal from the terminal station 3 within coverage at a current position, and stores waveform data of the received terminal uplink signal. The mobile relay station 2 wirelessly transmits a base station downlink signal including the waveform data of the terminal uplink signal to the base station 4 at a timing when the base station 4 exists in the coverage. The base station 4 demodulates the base station downlink signal received from the mobile relay station 2 to obtain the waveform data of the terminal uplink signal. The base station 4 demodulates and decodes the terminal uplink signal represented by the waveform data to obtain terminal transmission data that is data transmitted by the terminal station 3.

Note that, in the wireless communication system 1 according to the present embodiment, the mobile relay station 2 and the terminal station 3 perform wireless communication using LPWA as an example. Each terminal station 3 may transmit the same terminal uplink signal toward the mobile relay station 2 a plurality of times to ensure reliability of communication. Further, as described above, it is assumed that the number of terminal stations 3 is large. With such a configuration, there is a case where the amount of communication of data transmitted from the terminal stations 3 to the mobile relay station 2 increases, and a communication band is tight. In the wireless communication system 1 according to the present embodiment, the diameter of a beam emitted on the ground by the mobile relay station 2 is narrowed to prevent tightness of the communication band. By making an emission range of the beam into a spot as described above, the number of IoT terminals that can communicate at the same time is reduced, so that it is possible to suppress a decrease in the reliability of communication by making it difficult to cause a collision of data. In addition, since a communication target area is scanned with the beam, wide coverage can be implemented without increasing the number of beams more than necessary.

Each terminal station 3 transmits data of the terminal uplink signal including predetermined data such as environmental data to the mobile relay station 2. Each terminal station 3 may transmit the terminal uplink signal including predetermined data such as environmental data and position information indicating a position of the terminal station 3 to the mobile relay station 2. Note that the terminal station 3 includes, for example, a positioning device such as a global positioning system (GPS) receiver, and generates position information indicating the position of the terminal station 3.

The mobile relay station 2 receives a terminal uplink signal from each terminal station 3. The mobile relay station 2 measures a congestion degree of communication. The congestion degree of communication is, for example, a degree represented by the number of accesses of terminal uplink communication per unit time from the plurality of terminal stations 3 in the mobile relay station 2 (transmission frequency of the terminal uplink signal per unit time) or a received signal strength indicator (RSSI) (received signal strength) of a frequency band of the terminal uplink communication. In addition, the mobile relay station 2 may extract position information indicating a position of the terminal station 3 from each terminal uplink signal.

The mobile relay station 2 changes a scanning speed of the beam scanning the communication target area on the basis of the congestion degree of communication. The mobile relay station 2 may change the scanning speed of the beam scanning the communication target area on the basis of the congestion degree of communication and position information indicating positions of the respective plurality of terminal stations 3.

At this time, for example, the mobile relay station 2 changes the scanning speed so that the congestion degrees of communication for a respective plurality of small areas into which the communication target area is divided are made uniform in the small areas. Note that the uniformization here may include an error within a predetermined allowable range, and does not mean that the congestion degrees of communication are completely equal in the plurality of small areas.

The diameter of the beam is determined on the basis of, for example, a trade-off between the number of accommodated terminal stations 3 and signal interference. Here, a signal gain is improved as the diameter of the beam is reduced (as the emission range of the beam is made into a spot), but the number of accommodated terminal stations 3 (terminal stations 3 that can be simultaneously connected to the mobile relay station 2) is reduced.

Note that the diameter of each of the small areas into which the communication target area is divided may be determined in advance to be, for example, a length substantially equal to the diameter of the beam. That is, the shape and size of the small area and the shape and size of the emission range of the beam may be substantially the same.

Hereinafter, identification information assigned to each of the small areas into which the communication target area is divided is referred to as "area information". The mobile relay station 2 transmits, to the terminal station 3 located in the beam emission range, a control signal (Hereinafter, it is referred to as a "transmission permission signal".) indicating permission to transmit data such as environmental data to the mobile relay station 2 of the terminal station 3. The mobile relay station 2 transmits a terminal downlink signal including the transmission permission signal to the terminal station 3 on the ground while scanning the communication target area with the beam whose emission range is made into a spot. Note that the transmission permission signal may further include area information on a small area to which the beam is emitted.

In a case where the transmission permission signal is received (in a case where the terminal station 3 is located in the emission range of a narrow beam), the terminal station 3 starts transmission of a terminal uplink signal to the mobile relay station 2. In a case where the terminal station 3 does not receive the transmission permission signal (in a case where the terminal station 3 is not located in the emission range of the narrow beam), the terminal station 3 waits without transmitting the terminal uplink signal to the mobile relay station 2. The terminal station 3 includes data such as environmental data and position information indicating the position of the terminal station 3 in the terminal uplink signal to be transmitted to the mobile relay station 2. Note that the mobile relay station 2 may derive (predict) the congestion degree of the mobile relay station 2 in the next orbiting by using the position information on the terminal station 3 in the current orbiting.

In addition, the terminal station 3 may store the longitude and latitude of a range of the small area in advance as area information. The terminal station 3 may recognize area information on a small area including the position of the terminal station 3 on the basis of the longitude and latitude of the position of the terminal station 3. In this case, in a case where the small area based on the area information included in the transmission permission signal matches the small area including the position of the terminal station 3, the terminal station 3 starts transmission of the terminal uplink signal to the mobile relay station 2.

Note that, in a case where the terminal station 3 can recognize the small area including the position of the terminal station 3, the terminal station 3 may include the area information on the small area including the position of the terminal station 3 in the terminal uplink signal to be transmitted to the mobile relay station 2 instead of including the position information indicating the position of the terminal station 3. As a result, the mobile relay station 2 can estimate the number of terminal stations 3 located in the small area.

The mobile relay station 2 scans the communication target area with the beam to cover all the small areas in the communication target area, thereby being able to communicate with the plurality of terminal stations 3 while making the congestion degrees of communication uniform.

Note that details will be described later of a configuration and operation of each device in processing (Hereinafter, it is referred to as "transmission control processing".) for controlling a transmission timing of the terminal uplink signal from the terminal station 3 to the mobile relay station 2. Hereinafter, first, details will be described of a configuration and operation of each device in processing (Hereinafter, it is referred to as "data collection processing".) for the base station 4 to collect, via the mobile relay station 2, data such as environmental data transmitted from each terminal station 3.

(Data Collection Processing)

A configuration of each device in the data collection processing will be described.

The mobile relay station 2 includes an antenna 21, a terminal communication unit 22, a data storage unit 23, a base station communication unit 24, and an antenna 25.

The terminal communication unit 22 includes a reception unit 221 and a received waveform recording unit 222. The reception unit 221 receives a terminal uplink signal through the antenna 21. The received waveform recording unit 222 samples a received waveform of the terminal uplink signal received by the reception unit 221, and generates waveform data indicating a value obtained by the sampling. The received waveform recording unit 222 writes received waveform information including a reception time of the terminal uplink signal in the antenna 21 and the generated waveform data in the data storage unit 23. The data storage unit 23 stores the received waveform information written by the received waveform recording unit 222.

The base station communication unit 24 transmits the received waveform information to the base station 4 by a base station downlink signal of any wireless communication scheme. The base station communication unit 24 includes a storage unit 241, a control unit 242, a transmission data modulation unit 243, and a transmission unit 244. The storage unit 241 stores a transmission start timing calculated in advance on the basis of orbit information on the LEO satellite on which the mobile relay station 2 is mounted and a position of the base station 4. The orbit information on the LEO is information from which it is possible to obtain a position, speed, movement direction, and the like of the LEO satellite at an arbitrary time. A transmission time may be represented by, for example, an elapsed time from the transmission start timing.

The control unit 242 controls the transmission data modulation unit 243 and the transmission unit 244 to transmit the received waveform information to the base station 4 at the transmission start timing stored in the storage unit 241. The transmission data modulation unit 243 reads the received waveform information from the data storage unit 23 as transmission data, and modulates the read transmission data to generate a base station downlink signal. The transmission unit 244 converts the base station downlink signal from an electrical signal into a wireless signal, and transmits the wireless signal from the antenna 25.

The terminal station 3 includes a data storage unit 31, a transmission unit 32, and one or a plurality of antennas 33. The data storage unit 31 stores sensor data and the like. The transmission unit 32 reads the sensor data from the data storage unit 31 as terminal transmission data, and transmits the terminal uplink signal including the read terminal transmission data from the antenna 33 by a wireless signal.

The transmission unit 32 transmits the signal by LPWA. LPWA includes LoRaWAN (registered trademark), Sigfox (registered trademark), Long Term Evolution for Machines (LTE-M), Narrow Band (NB)-IoT, and the like, but any wireless communication scheme can be used. In addition, the transmission unit 32 may perform transmission with another terminal station 3 by time division multiplexing, orthogonal frequency division multiplexing (OFDM), or the like.

The transmission unit 32 determines a channel and a transmission timing to be used for transmission of a terminal uplink signal by the terminal station 3 by a method determined in advance in a wireless communication scheme to be used. In addition, the transmission unit 32 may perform beam formation of signals transmitted from the plurality of antennas 33 by the method determined in advance in the wireless communication scheme to be used.

The base station 4 includes an antenna 41, a reception unit 42, a base station signal reception processing unit 43, and a terminal signal reception processing unit 44. The reception unit 42 converts the base station downlink signal received by the antenna 41 into an electrical signal. The base station signal reception processing unit 43 demodulates and decodes the received signal converted into the electrical signal by the reception unit 42 to obtain received waveform information. The base station signal reception processing unit 43 outputs the received waveform information to the terminal signal reception processing unit 44.

The terminal signal reception processing unit 44 performs processing of receiving the terminal uplink signal indicated by the received waveform information. At this time, the terminal signal reception processing unit 44 performs reception processing according to the wireless communication scheme used for transmission by the terminal station 3 to acquire the terminal transmission data. The terminal signal reception processing unit 44 includes a terminal signal demodulation unit 441 and a terminal signal decoding unit 442.

The terminal signal demodulation unit 441 demodulates the waveform data and outputs a symbol obtained by the demodulation to the terminal signal decoding unit 442. The terminal signal demodulation unit 441 may perform the demodulation after performing processing of compensating for the Doppler shift of the terminal uplink signal received by the antenna 21 of the mobile relay station 2 on a signal indicated by the waveform data. The Doppler shift received by the terminal uplink signal received by the antenna 21 is calculated in advance on the basis of the position of the terminal station 3 and the orbit information on the LEO on which the mobile relay station 2 is mounted. The terminal signal decoding unit 442 decodes the symbol demodulated by terminal signal demodulation unit 441, and obtains the terminal transmission data transmitted from the terminal station 3.

Next, beam scanning will be described.

Figure 2:
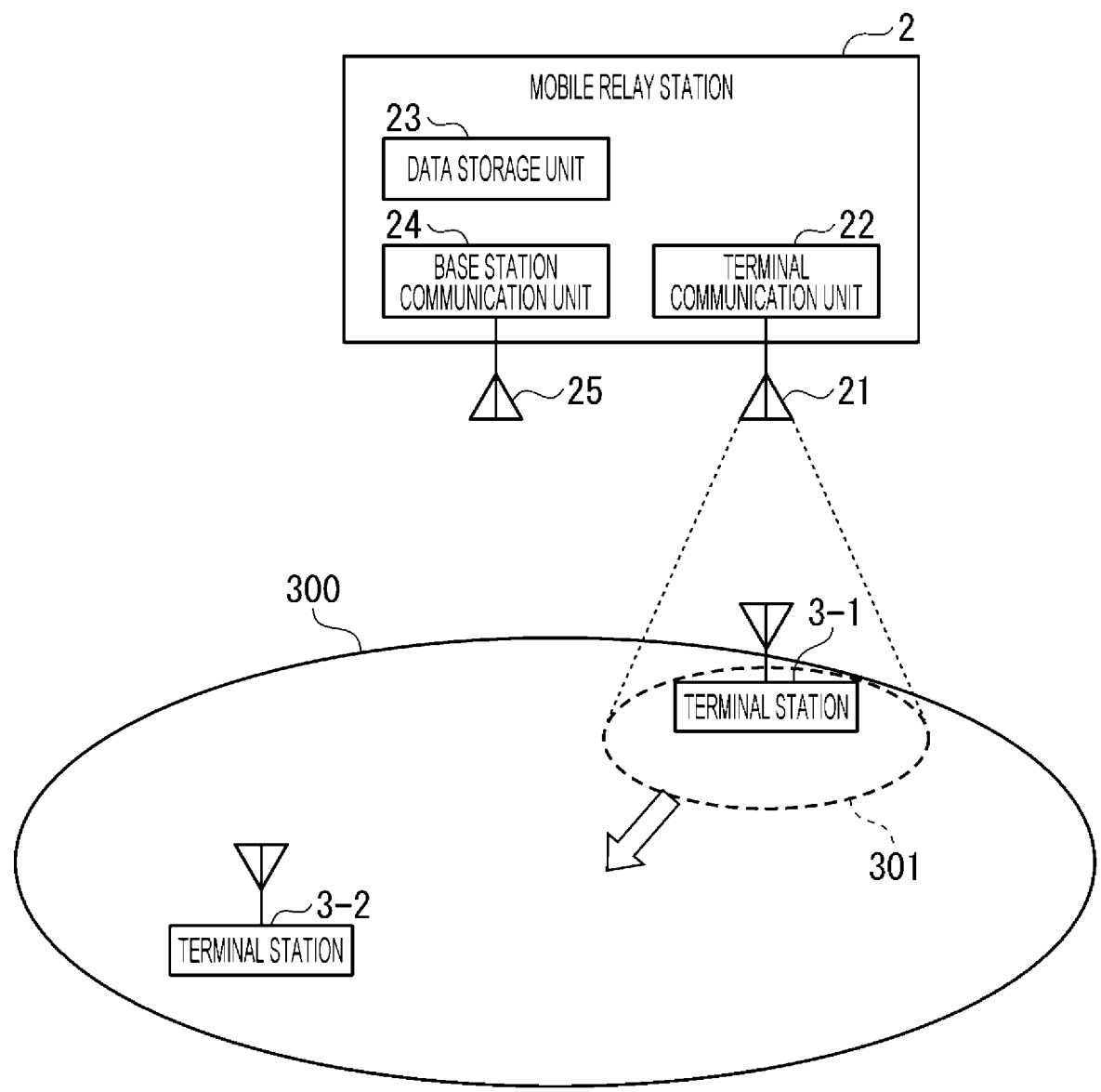
FIG. 2 is a diagram illustrating a beam scanning example according to the embodiment.

FIG. 2 is a diagram illustrating a beam scanning example. The antenna 21 emits a beam whose emission range is narrowed to a small area of a communication target area 300 (service area). As a result, only a terminal station 3-1 located in an emission range 301 of the beam transmits the terminal uplink signal to the mobile relay station 2. The terminal communication unit 22 scans the communication target area 300 with the beam by using the antenna 21. An arrow illustrated in FIG. 2 represents an example of a scanning direction. The terminal station 3-2 does not transmit the terminal uplink signal to the mobile relay station 2 until the terminal station 3-2 enters the scanned emission range 301 of the beam.

In a case where the transmission frequency (appearance frequency) of the terminal uplink signal is high in the emission range 301 (in a case where the congestion degree is high), the terminal communication unit 22 reduces the scanning speed of the beam. That is, the terminal communication unit 22 increases an emission time of the beam for the emission range 301 (small area) in which there is the terminal station 3 having a high transmission frequency of the terminal uplink signal. The terminal communication unit 22 may increase the emission time of the beam for the emission range 301 (small area) in which there are a large number of terminal stations 3. As a result, the beam is emitted intensively to a small area in which a large number of terminal stations 3 are distributed (such as an urban area in which the terminal stations 3 are densely distributed), so that it is possible to adaptively increase the number of terminal stations 3 that can be accommodated.

Operation of the wireless communication system 1 in the data collection processing will be described.

Figure 3:
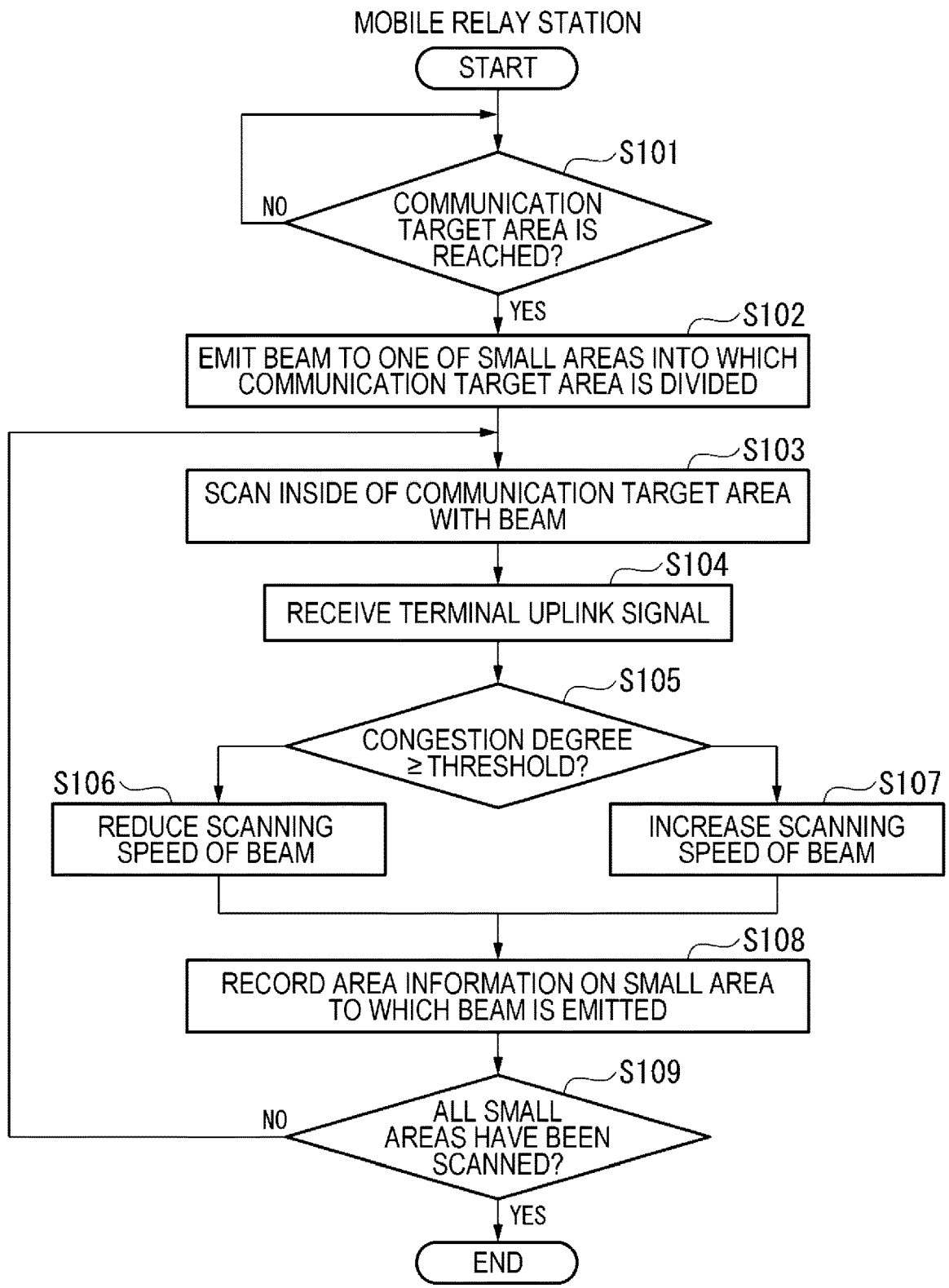
FIG. 3 is a flow diagram illustrating beam scanning processing according to the embodiment.

FIG. 3 is a flow diagram illustrating beam scanning processing. An area control unit 224 determines whether or not the mobile relay station 2 has arrived at a predetermined position where the beam can be emitted to the communication target area 300. For example, the area control unit 224 determines whether or not the mobile relay station 2 has arrived above the communication target area 300 (step S101). In a case where it is determined that the mobile relay station 2 has not arrived at the predetermined position (step S101: No), the area control unit 224 re-executes step S101 after a lapse of a predetermined time.

In a case where it is determined that the mobile relay station 2 has arrived at the predetermined position (step S101: Yes), an antenna drive unit 228 emits the beam to one of the plurality of small areas into which the communication target area 300 is divided, by using the antenna 21 on the basis of area information generated by the area control unit 224 (step S102). The antenna drive unit 228 scans the inside of the communication target area 300 with the beam at a scanning speed depending on the congestion degree (step S103). The reception unit 221 receives the terminal uplink signal by using the antenna 21. A communication state measuring unit 223 derives a congestion degree of communication on the basis of the terminal uplink signal (step S104).

The antenna drive unit 228 determines whether or not the congestion degree of communication is greater than or equal to a threshold (step S105). In a case where it is determined that the congestion degree of communication is greater than or equal to the threshold (step S105: Yes), the antenna drive unit 228 drives the antenna 21 to reduce the scanning speed of the beam. The antenna drive unit 228 may drive the antenna 21 to temporarily stop scanning with the beam (step S106). In a case where it is determined that the congestion degree of communication is less than the threshold (step S105: No), the antenna drive unit 228 drives the antenna 21 to increase the scanning speed of the beam (step S107).

The antenna drive unit 228 records area information on the small area to which the beam is emitted (the small area overlapping the emission range 301) in a storage unit 225 as information on a scanned small area (step S108). As a result, the antenna drive unit 228 can distinguish the scanned small area and an unscanned small area in the communication target area 300.

The antenna drive unit 228 determines whether or not all the small areas in the communication target area 300 have been scanned (step S109). In a case where it is determined that there is an unscanned small area (step S109: No), the antenna drive unit 228 returns the processing to step S103. In a case where it is determined that all the small areas have been scanned (step S109: Yes), the antenna drive unit 228 ends the processing illustrated in FIG. 3.

Figure 4:
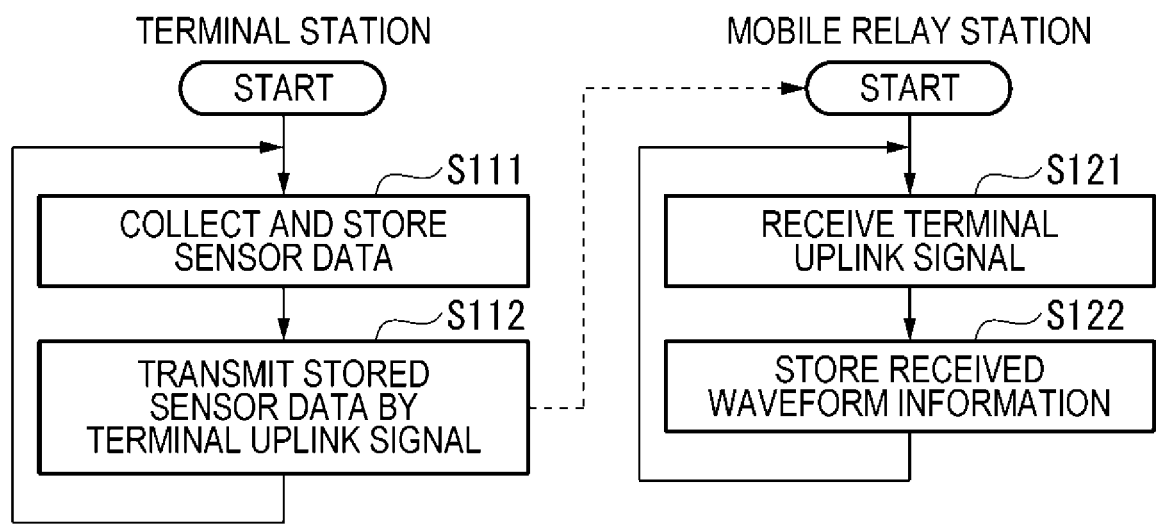
FIG. 4 is a flow diagram illustrating data collection processing performed by the wireless communication system according to the embodiment.

FIG. 4 is a flow diagram illustrating processing performed by the wireless communication system 1 in a case where a terminal uplink signal is transmitted from the terminal station 3 to the mobile relay station 2.

The terminal station 3 acquires sensor data (for example, environmental data or the like) detected by a sensor (not illustrated) included outside or inside at any time, and writes the acquired sensor data in the data storage unit 31 (step S111). The transmission unit 32 reads the sensor data from the data storage unit 31 as terminal transmission data. The transmission unit 32 wirelessly transmits the terminal uplink signal including the terminal transmission data from the antenna 33 at the transmission start timing obtained in advance on the basis of the orbit information on the LEO satellite on which the mobile relay station 2 is mounted (step S112). The terminal station 3 repeats the processing from step S111.

The reception unit 221 of the mobile relay station 2 receives the terminal uplink signal transmitted from the terminal station 3 (step S121). Depending on the wireless communication scheme of the terminal station 3 as a transmission source, there are a case where the terminal uplink signal is received from only one terminal station 3 in a time division manner at the same frequency and a case where the terminal uplink signals are simultaneously received from a plurality of terminal stations 3 at the same frequency. The received waveform recording unit 222 writes the received waveform information in which the waveform data representing a waveform of the terminal uplink signal received by the reception unit 221 is associated with the reception time in the data storage unit 23 (step S122). The mobile relay station 2 repeats the processing from step S121.

Figure 5:
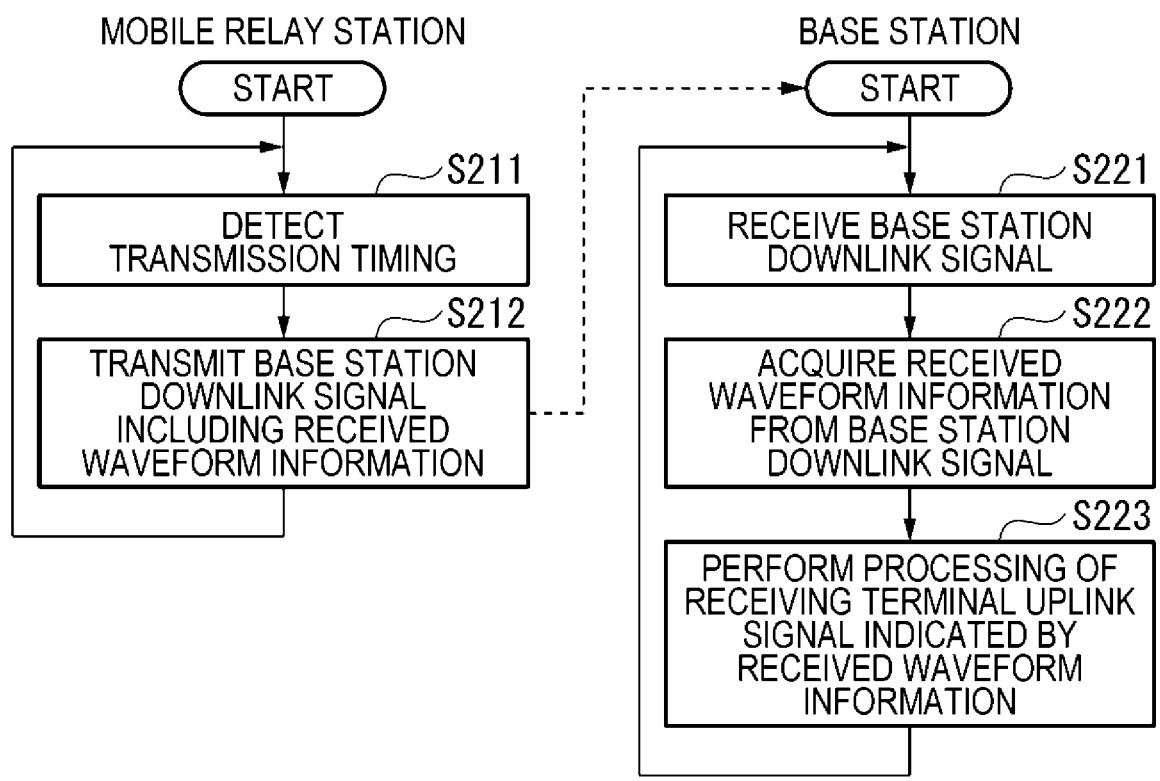
FIG. 5 is a flow diagram illustrating data collection processing performed by the wireless communication system according to the embodiment.

FIG. 5 is a flow diagram illustrating processing performed by the wireless communication system 1 in a case where a base station downlink signal is transmitted from the mobile relay station 2 to the base station 4.

When detecting that the transmission start timing stored in the storage unit 241 is a current time, the control unit 242 included in the base station communication unit 24 of the mobile relay station 2 instructs the transmission data modulation unit 243 and the transmission unit 244 to transmit the received waveform information (step S211). The transmission data modulation unit 243 reads the received waveform information accumulated in the data storage unit 23 as transmission data, modulates the read transmission data, and generates a base station downlink signal. The transmission unit 244 transmits the base station downlink signal generated by the transmission data modulation unit 243 from the antenna 25 by a wireless signal (step S212). The mobile relay station 2 repeats the processing from step S211.

The antenna 41 of the base station 4 receives the base station downlink signal from the mobile relay station 2 (step S221). The reception unit 42 converts the base station downlink signal received by the antenna 41 into a received signal of an electrical signal and outputs the received signal to the base station signal reception processing unit 43. The base station signal reception processing unit 43 demodulates the received signal and decodes the demodulated received signal (step S222). The base station signal reception processing unit 43 outputs the received waveform information obtained by the decoding to the terminal signal reception processing unit 44.

The terminal signal reception processing unit 44 performs processing of receiving the terminal uplink signal represented by the waveform data included in the received waveform information (step S223). Specifically, the terminal signal demodulation unit 441 specifies the wireless communication scheme used by the terminal station 3 for transmission of the terminal uplink signal on the basis of information specific to the wireless communication scheme included in the received signal represented by the waveform data. The terminal signal demodulation unit 441 demodulates the received signal represented by the waveform data in accordance with the specified wireless communication scheme, and outputs a symbol obtained by the demodulation to the terminal signal decoding unit 442. The terminal signal decoding unit 442 decodes the symbol input from the terminal signal demodulation unit 441 according to the specified wireless communication scheme, and obtains the terminal transmission data transmitted from the terminal station 3. Note that the terminal signal decoding unit 442 can also use a decoding scheme with a large calculation load, such as successive interference cancellation (SIC). The base station 4 repeats the processing from step S221.

(Transmission Control Processing)

A configuration of each device in the transmission control processing will be described.

A configuration of the mobile relay station 2 will be described. As illustrated in FIG. 1, the mobile relay station 2 further includes the communication state measuring unit 223, the area control unit 224, the storage unit 225, a transmission unit 226, a position information acquisition unit 227, and the antenna drive unit 228.

The communication state measuring unit 223 measures communication states of terminal uplink communications from the plurality of terminal stations 3 in the reception unit 221. The communication state measuring unit 223 generates information (Hereinafter, it is referred to as "congestion degree information".) indicating the congestion degree of communication on the basis of a measurement result. For example, the communication state measuring unit 223 measures the number of accesses of terminal uplink communication per unit time from the plurality of terminal stations 3 or the received signal strength of the frequency band of the terminal uplink communication in the reception unit 221, and generates the congestion degree information.

Note that the congestion degree information may or may not be information itself indicating the number of accesses of terminal uplink communication per unit time from the plurality of terminal stations 3 or the received signal strength of the frequency band of the terminal uplink communication. For example, the congestion degree information may be information indicating a level determined on the basis of whether or not information is within a predetermined threshold range, the information indicating the number of accesses of terminal uplink communication per unit time from the plurality of terminal stations 3 or the received signal strength of the frequency band of the terminal uplink communication. That is, the level is uniquely determined, for example, as level 1 in a case where the number of accesses of terminal uplink communication per unit time from the plurality of terminal stations 3 is within a certain range, level 2 in a case where the number of accesses is within a higher range, and level 3 in a case where the number of accesses is within an even higher range. In this case, information in which a range of a value of the number of accesses or the received signal strength is associated with a level is stored in advance in the storage unit 225 or the like, for example.

The position information acquisition unit 227 acquires position information on each terminal station 3. The position information is included in the terminal uplink signal transmitted from each terminal station 3 and received by the reception unit 221.

The area control unit 224 controls a timing at which the terminal downlink signal including the transmission permission signal is transmitted to the terminal station 3. As described above, the transmission permission signal is a control signal indicating that the terminal station 3 is permitted to transmit data such as environmental data to the mobile relay station 2 of the terminal station 3. The area control unit 224 acquires congestion degree information generated by the communication state measuring unit 223. In addition, the area control unit 224 acquires the position information indicating the position of each terminal station 3 acquired by the position information acquisition unit 227.

The area control unit 224 changes the scanning speed of the beam by using the antenna drive unit 228 on the basis of the acquired congestion degree information. The area control unit 224 may change the scanning speed of the beam by using the antenna drive unit 228 on the basis of the acquired congestion degree information and position information. As described above, for example, the area control unit 224 changes the scanning speed of the beam so that the congestion degrees of communication with the terminal stations 3 included in the divided small areas are made uniform in the plurality of small areas. The area control unit 224 stores the area information on each small area in the storage unit 225.

The area control unit 224 refers to the area information recorded in the storage unit 225, and generates a transmission permission signal to be transmitted toward a small area (a small area associated with the area information) of the emission range of the beam. The area control unit 224 controls a timing at which the terminal downlink signal including the transmission permission signal is transmitted to the terminal station 3. The area control unit 224 controls a changing speed of a direction of the antenna 21 (the scanning speed of the beam) by using the antenna drive unit 228.

The direction of the antenna 21 is changed by the antenna drive unit 228 depending on the control by the area control unit 224. The antenna drive unit 228 changes the direction of the antenna 21 (emission direction of the beam) by using, for example, a mechanical drive mechanism.

The transmission unit 226 acquires the transmission permission signal generated by the area control unit 224, and transmits the terminal downlink signal including the acquired transmission permission signal from the antenna 21 by a wireless signal. The transmission unit 226 transmits the signal by LPWA. The transmission unit 226 determines a channel to be used for transmission of the terminal downlink signal by the mobile relay station 2 by a method determined in advance in the wireless communication scheme to be used. A timing at which the transmission unit 226 transmits the terminal downlink signal is controlled by the area control unit 224.

The storage unit 225 stores the transmission start timing for each communication target area calculated in advance on the basis of the orbit information on the LEO satellite on which the mobile relay station 2 is mounted and a position of the communication target area. The orbit information on the LEO is information from which it is possible to obtain a position, speed, movement direction, and the like of the LEO satellite at an arbitrary time. A transmission time may be represented by, for example, an elapsed time from the transmission start timing. The area control unit 224 controls the transmission unit 226 to transmit the terminal downlink signal including the transmission permission signal to the ground at the transmission start timing for each communication target area stored in the storage unit 225.

As described above, the mobile relay station 2 is included in, for example, an LEO satellite that orbits above the earth at a predetermined period. The area control unit 224 determines an initial value of the scanning speed of the beam on the basis of, for example, the congestion degree of communication when terminal uplink signals are received from the plurality of terminal stations 3 in the communication target area in the past (for example, at a time point before one orbiting). Alternatively, the area control unit 224 may determine the initial value of the scanning speed of the beam on the basis of, for example, the congestion degree of communication when the terminal uplink signals are received from the plurality of terminal stations 3 in the communication target area in the same time zone in the past.

A configuration of the terminal station 3 will be described. As illustrated in FIG. 1, the terminal station 3 further includes a reception unit 34, a transmission control unit 35, and a position information generation unit 36.

In the case of being located in the emission range of the beam, the reception unit 34 receives the terminal downlink signal through the antenna 33.

The transmission control unit 35 acquires the transmission permission signal from the terminal downlink signal received by the reception unit 34.

The position information generation unit 36 includes a positioning device such as a GPS receiver, for example, and specifies the position of the terminal station 3. The position information generation unit 36 generates position information indicating the specified position of the terminal station 3.

The transmission control unit 35 acquires the position information indicating the position of the terminal station 3 generated by the position information generation unit 36. The transmission control unit 35 determines whether or not the transmission permission signal is acquired. In a case where the transmission permission signal is not acquired, the transmission control unit 35 waits without starting transmission of the terminal uplink signal to the mobile relay station 2.

In a case where the transmission permission signal is acquired, the transmission control unit 35 causes the transmission unit 32 to start transmission of the terminal uplink signal to the mobile relay station 2. At this time, the transmission control unit 35 causes the transmission unit 32 to transmit the terminal uplink signal including the position information generated by the position information generation unit 36 in addition to data such as environmental data.

The transmission unit 32 transmits the terminal uplink signal. The transmission unit 32 reads sensor data, for example, environmental data and the like from the data storage unit 31 as terminal transmission data. The transmission unit 32 transmits the terminal uplink signal including the read terminal transmission data and the position information indicating the position of the terminal station 3 generated by the position information generation unit 36 from the antenna 33 by a wireless signal. The transmission unit 32 transmits the signal by LPWA.

The reception unit 221 of the mobile relay station 2 receives the terminal uplink signal through the antenna 21. The received waveform recording unit 222 samples a received waveform of the terminal transmission data included in the terminal uplink signal received by the reception unit 221, and generates waveform data indicating a value obtained by the sampling. The received waveform recording unit 222 writes received waveform information including a reception time of the terminal uplink signal in the antenna 21 and the selected waveform data in the data storage unit 23. The data storage unit 23 stores the received waveform information written by the received waveform recording unit 222.

Operation of the wireless communication system 1 in the transmission control processing will be described.

Figure 6:
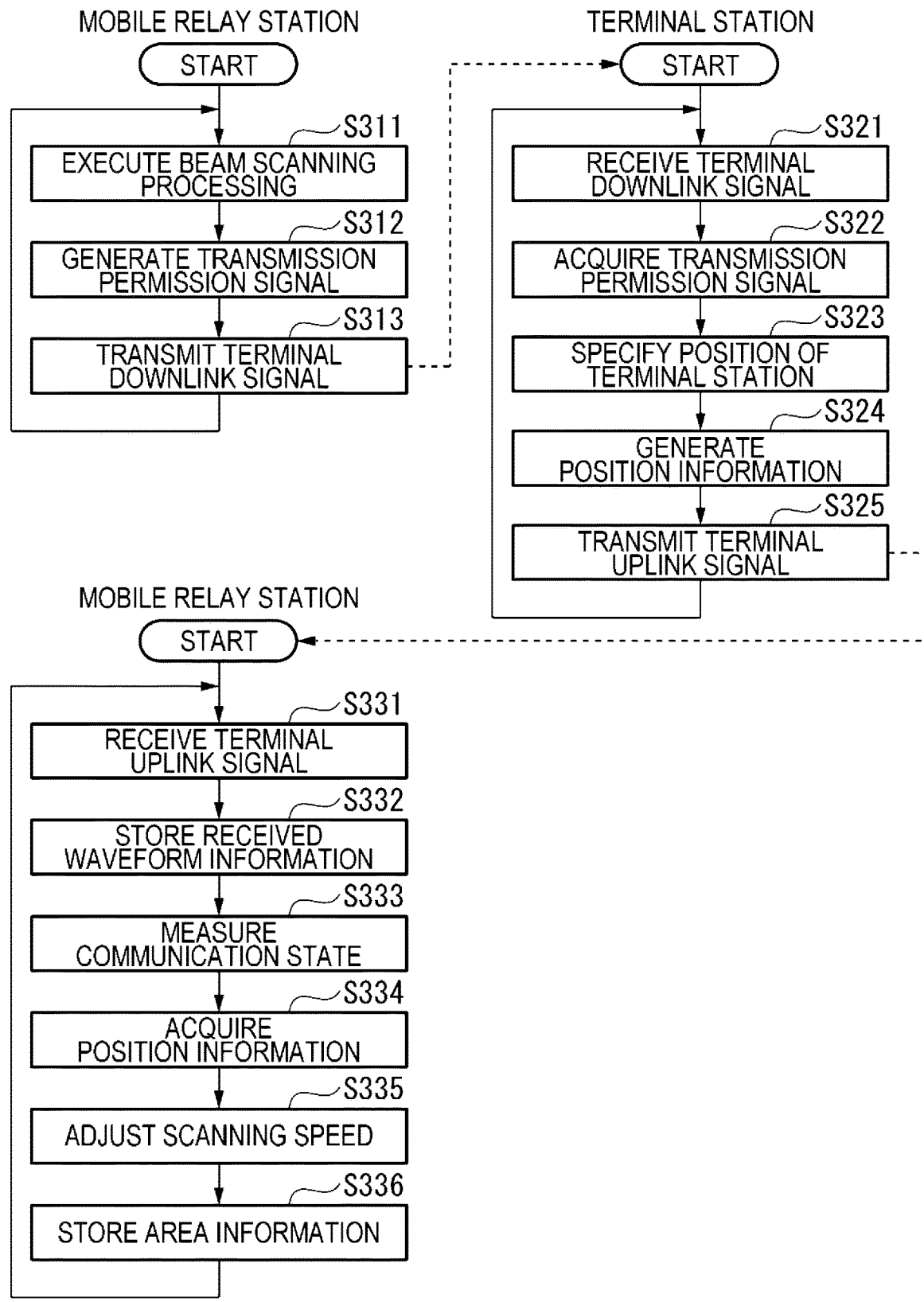
FIG. 6 is a flow diagram illustrating transmission control processing performed by the wireless communication system according to the embodiment.

FIG. 6 is a flow diagram illustrating transmission control processing performed by the wireless communication system 1. The area control unit 224 of the mobile relay station 2 uses the antenna drive unit 228 to execute beam scanning processing (step S311). The area control unit 224 of the mobile relay station 2 generates a transmission permission signal (step S312). The transmission unit 226 acquires the transmission permission signal generated by the area control unit 224, and transmits the terminal downlink signal including the acquired transmission permission signal from the antenna 21 by a wireless signal (step S313). The mobile relay station 2 repeats the processing from step S311.

The reception unit 34 of the terminal station 3 receives the terminal downlink signal through the antenna 33 (step S321). The transmission control unit 35 of the terminal station 3 acquires the transmission permission signal from the terminal downlink signal received by the reception unit 34 (step S322).

The position information generation unit 36 of the terminal station 3 specifies the position of the terminal station 3 (step S323). The position information generation unit 36 generates position information indicating the specified position of the terminal station 3. The transmission control unit 35 acquires the position information indicating the position of the terminal station 3 generated by the position information generation unit 36 (step S324).

The transmission control unit 35 causes the transmission unit 32 to start transmission of the terminal uplink signal. At this time, the transmission control unit 35 causes the transmission unit 32 to transmit the terminal uplink signal including data such as environmental data and the position information indicating the position of the terminal station 3 generated by the position information generation unit 36. The transmission unit 32 transmits the terminal uplink signal (step S325). The terminal station 3 repeats the processing from step S321.

The reception unit 221 of the mobile relay station 2 receives the terminal uplink signal through the antenna 21 (step S331). The received waveform recording unit 222 of the mobile relay station 2 samples a received waveform of the terminal uplink signal received by the reception unit 221, and generates waveform data indicating a value obtained by the sampling. The received waveform recording unit 222 writes received waveform information including a reception time of the terminal uplink signal in the antenna 21 and the selected waveform data in the data storage unit 23. The data storage unit 23 stores the received waveform information written by the received waveform recording unit 222 (step S332).

The communication state measuring unit 223 of the mobile relay station 2 measures communication states of terminal uplink communications from the plurality of terminal stations 3 in the reception unit 221 (step S333), and generates congestion degree information. The position information acquisition unit 227 of the mobile relay station 2 acquires position information on each terminal station 3 (step S334). The position information is included in the terminal uplink signal transmitted from each terminal station 3 and received by the reception unit 221.

The area control unit 224 adjusts the scanning speed of the beam on the basis of the acquired congestion degree information and position information (step S335). As described above, for example, the mobile relay station 2 adjusts the scanning speed so that the congestion degrees of communication with the terminal stations 3 included in the divided small areas are made uniform among the plurality of small areas. The area control unit 224 stores the area information on the small area scanned with the beam in the storage unit 225 (step S336). The mobile relay station 2 repeats the processing from step S331.

As described above, according to the wireless communication system 1 according to the first embodiment, the mobile relay station 2 receives terminal uplink signals respectively transmitted from the plurality of terminal stations 3, and measures communication states. The mobile relay station 2 generates congestion degree information based on the communication states. In addition, the mobile relay station 2 acquires position information included in the terminal uplink signals respectively transmitted from the plurality of terminal stations 3. The position information is information indicating the position of each terminal station 3. The mobile relay station 2 adjusts the scanning speed of the beam in the communication target area on the basis of the congestion degree information and the position information.

The mobile relay station 2 permits transmission of a terminal uplink signal for each terminal station 3 existing in a small area into which the communication target area is divided in the subsequent orbiting. The mobile relay station 2 transmits a terminal downlink signal including a transmission permission signal toward the ground.

The terminal station 3 acquires the transmission permission signal indicated by the received terminal downlink signal, and acquires the transmission permission signal. The terminal station 3 specifies the position of the terminal station 3 by using, for example, a positioning device or the like. In a case where the transmission permission signal is acquired, the terminal station 3 starts transmission of the terminal uplink signal to the mobile relay station 2. At this time, the terminal station 3 may transmit the terminal uplink signal including data such as environmental data and position information indicating a position of the terminal station 3 to the mobile relay station 2.

As described above, the wireless communication system 1 according to the first embodiment includes one or more terminal stations 3 (first communication devices) located in one or more small areas among a plurality of small areas into which the communication target area 300 is divided, the mobile relay station 2 (relay device) (relay apparatus), and the base station 4 (second communication device). The antenna drive unit 228 drives one or more antennas 21 to scan the plurality of small areas with one or more beams while emitting the beams to the communication target area, the beams each having the emission range 301 narrower than the communication target area 300. The reception unit 221 acquires a terminal uplink signal (first wireless signal) transmitted from the terminal stations 3 located in the emission range 301 from one or more antennas 21. The transmission unit 244 transmits a base station downlink signal (second wireless signal) depending on the terminal uplink signal to the base station 4 (second communication device).

With such a configuration, wide coverage can be implemented without increasing the number of beams more than necessary.

The antenna drive unit 228 drives the direction of the antenna 21 by using, for example, a mechanical drive mechanism to scan the inside of the communication target area 300 with the beam at the scanning speed depending on the congestion degree. The antenna drive unit 228 may drive the antenna 21 to reduce the scanning speed in a case where the congestion degree is greater than or equal to the threshold. The antenna drive unit 228 may drive the antenna 21 to increase the scanning speed in a case where the congestion degree is less than the threshold.

With such a configuration, the wireless communication system 1 can control the transmission timing of the terminal uplink signal from the terminal station 3 to the mobile relay station 2 for each emission range of the beam. The wireless communication system 1 adjusts the scanning speed of the beam to make the congestion degrees of communication uniform, for example. As a result, even in a case where the congestion degree of communication fluctuates, the wireless communication system 1 can perform adjustment so that the congestion degrees of communication are made uniform, and thus, it is possible to transmit sensor data transmitted from a larger number of terminal stations 3 to the base station 4 via the mobile relay station 2 while suppressing a decrease in reliability of communication. Since the wireless communication system 1 can deploy wide coverage with a small number of beams, the wireless communication system 1 is a system suitable for IoT communication with few communication opportunities.

Note that, the area information indicating the small area may be, for example, information indicating a range indicated by latitude and longitude. Alternatively, the area information indicating the small area may be, for example, index information for identifying a small area divided as a predetermined section in advance by latitude, longitude, and the like. In this case, information indicating a range such as latitude and longitude corresponding to each piece of index information needs to be shared between the mobile relay station 2 and the terminal station 3 in advance.

Note that, as described above, in a case where the transmission permission signal is acquired, the transmission control unit 35 of the terminal station 3 causes the transmission unit 32 to start transmission of the terminal uplink signal. At this time, the transmission control unit 35 may cause the transmission of the terminal uplink signal to be started at a timing when a random time has elapsed after the transmission permission signal is acquired, instead of causing the transmission of the terminal uplink signal to be started immediately. As a result, it is possible to avoid that the plurality of terminal stations 3 located in the emission range of the beam (within the same small area) simultaneously start transmission of the terminal uplink signal to the mobile relay station 2. Thus, the congestion degree of communication in the mobile relay station 2 is reduced.

Modification 1 of First Embodiment

In a present modification, a mobile relay station transmits a base station downlink signal through a plurality of antennas. Hereinafter, differences from the first embodiment will be mainly described by using a case where multiple input multiple output (MIMO) is used for transmission of the base station downlink signals as an example.

Figure 7:
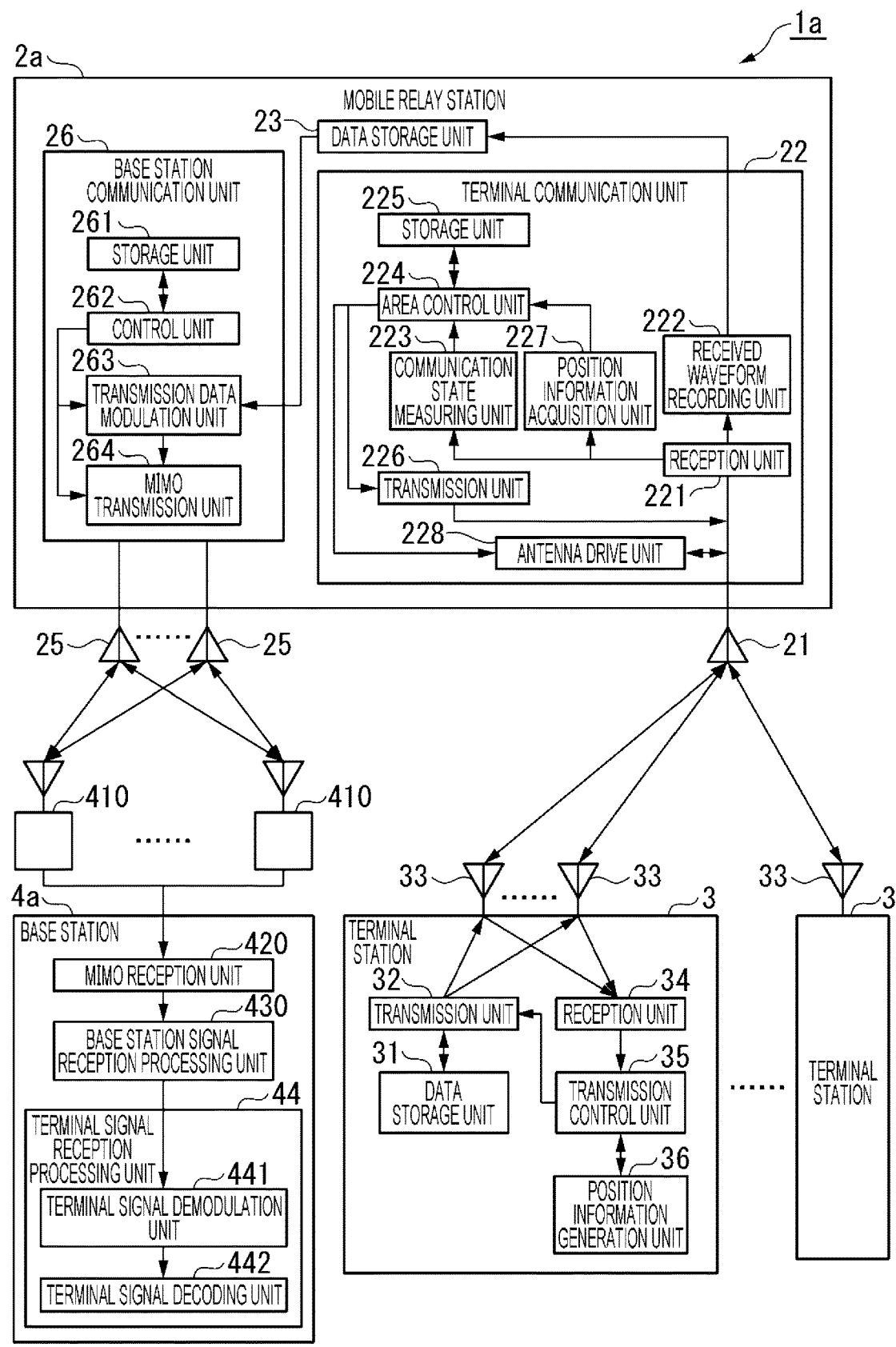
FIG. 7 is a configuration diagram of a wireless communication system according to Modification 1 of the first embodiment of the present invention.

FIG. 7 is a configuration diagram of a wireless communication system 1a according to Modification 1 of the first embodiment. In the figure, the same components as those of the wireless communication system 1 in the first embodiment illustrated in FIG. 1 are denoted by the same reference numerals, and the description thereof will be omitted. The wireless communication system 1a includes a mobile relay station 2a, the terminal station 3, and a base station 4a.

The mobile relay station 2a includes the antenna 21, the terminal communication unit 22, the data storage unit 23, a base station communication unit 26, and a plurality of the antennas 25. The base station communication unit 26 transmits received waveform information to the base station 4a by MIMO. The base station communication unit 26 includes a storage unit 261, a control unit 262, a transmission data modulation unit 263, and a MIMO transmission unit 264. The storage unit 261 stores a transmission start timing calculated in advance on the basis of orbit information on the LEO satellite on which the mobile relay station 2a is mounted and a position of the base station 4a. Further, the storage unit 261 stores in advance a weight (weighting factor) for each transmission time of the base station downlink signal transmitted from each antenna 25. The weight for each transmission time is calculated on the basis of the orbit information on the LEO satellite and a position of each of antenna stations 410 included in the base station 4a. Note that a constant weight may be used regardless of the transmission time.

The control unit 262 controls the transmission data modulation unit 263 and the MIMO transmission unit 264 to transmit the received waveform information to the base station 4a at the transmission start timing stored in the storage unit 261. Further, the control unit 262 instructs the MIMO transmission unit 264 on the weight for each transmission time read from the storage unit 261. A direction of the beam transmitted from the antennas 25 is determined on the basis of the weight. The transmission data modulation unit 263 reads the received waveform information from the data storage unit 23 as transmission data, converts the read transmission data into a parallel signal, and then modulates the parallel signal. The MIMO transmission unit 264 weights the modulated parallel signal by the weight on which the MIMO transmission unit 264 is instructed from the control unit 262, and generates a base station downlink signal to be transmitted from each antenna 25. The MIMO transmission unit 264 transmits the generated base station downlink signal from the antennas 25 by MIMO.

The base station 4a includes the plurality of antenna stations 410, a MIMO reception unit 420, a base station signal reception processing unit 430, and the terminal signal reception processing unit 44. An antenna station 410 is disposed at a position away from another antenna station 410 so that an arrival angle difference of wireless signals transmitted from the plurality of antennas 25 of the mobile relay station 2a increases. Each antenna station 410 converts the base station downlink signal received from the mobile relay station 2a into an electrical signal, and outputs the electrical signal to the MIMO reception unit 420.

The MIMO reception unit 420 aggregates the base station downlink signals received from the plurality of antenna stations 410. The MIMO reception unit 420 stores a weight for each reception time for the base station downlink signal received by each antenna station 410 on the basis of the orbit information on the LEO satellite and the position of each antenna station 410. The MIMO reception unit 420 multiplies the base station downlink signal input from each antenna station 410 by a weight corresponding to the reception time of the base station downlink signal, and combines received signals multiplied by the weight. Note that the same weight may be used regardless of the reception time. The base station signal reception processing unit 430 demodulates and decodes a combined received signal to obtain received waveform information. The base station signal reception processing unit 430 outputs the received waveform information to the terminal signal reception processing unit 44.

Operation of the wireless communication system 1a will be described.

Processing performed by the wireless communication system 1a in a case where the terminal uplink signal is transmitted from the terminal station 3 is similar to the processing performed by the wireless communication system 1 of the first embodiment illustrated in FIG. 4.

Figure 8:
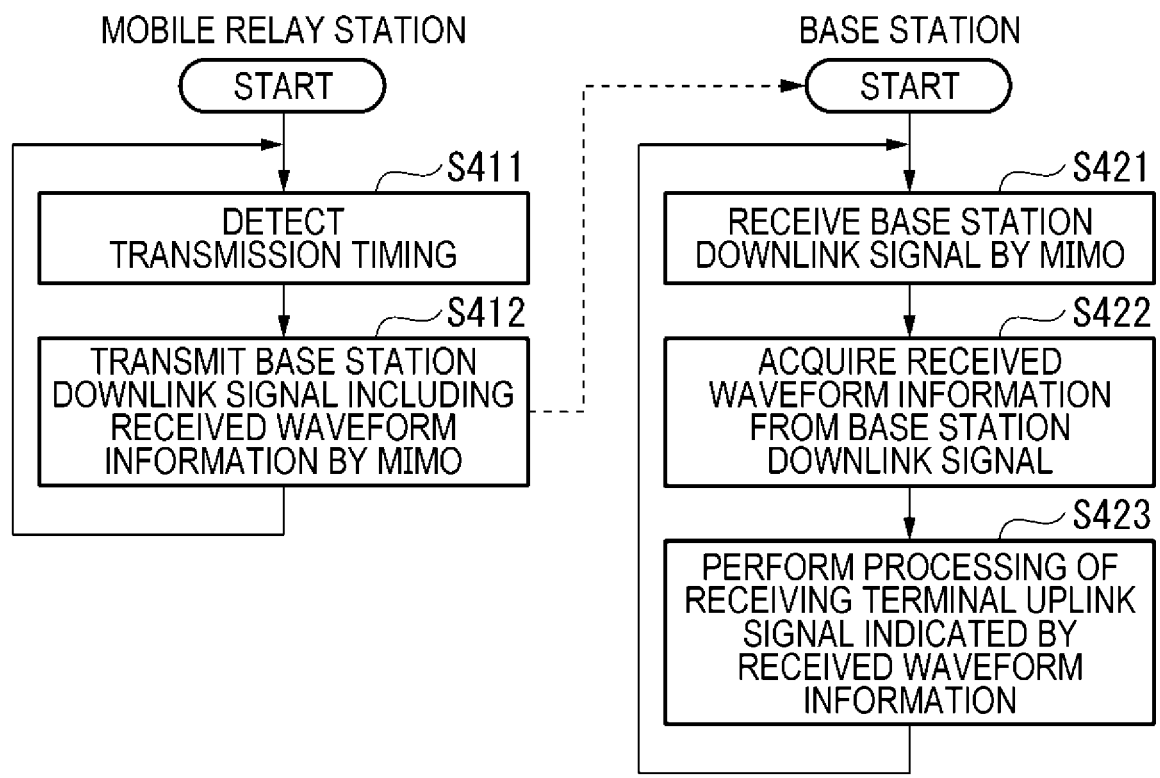
FIG. 8 is a flow diagram illustrating data collection processing performed by the wireless communication system according to the modification.

FIG. 8 is a flow diagram illustrating processing performed by the wireless communication system 1a in a case where a base station downlink signal is transmitted from the mobile relay station 2a. When detecting that the transmission start timing stored in the storage unit 261 is a current time, the control unit 262 included in the base station communication unit 26 of the mobile relay station 2a instructs the transmission data modulation unit 263 and the MIMO transmission unit 264 to transmit received waveform information (step S411). The transmission data modulation unit 263 reads the received waveform information accumulated in the data storage unit 23 as transmission data, performs parallel conversion on the read transmission data, and then modulates the transmission data. The MIMO transmission unit 264 weights the transmission data modulated by the transmission data modulation unit 263 by the weight on which the MIMO transmission unit 264 is instructed from the control unit 262, and generates a base station downlink signal that is a transmission signal to be transmitted from each antenna 25. The MIMO transmission unit 264 transmits the generated base station downlink signals from the antennas 25 by MIMO (step S412). The mobile relay station 2a repeats the processing from step S411.

Each antenna station 410 of the base station 4a receives the base station downlink signal from the mobile relay station 2a (step S421). Each antenna station 410 outputs a received signal obtained by converting the received base station downlink signal into an electrical signal to the MIMO reception unit 420. The MIMO reception unit 420 synchronizes timings of received signals received from the antenna stations 410. The MIMO reception unit 420 multiplies the received signals received by the respective antenna station 410 by the weights and adds the multiplied received signals together. The base station signal reception processing unit 430 demodulates an added received signal and decodes a demodulated received signal (step S422). The base station signal reception processing unit 430 outputs the received waveform information obtained by the decoding to the terminal signal reception processing unit 44.

The terminal signal reception processing unit 44 performs processing of receiving the terminal uplink signal represented by waveform data included in the received waveform information by processing similar to step S223 in the processing flow of the first embodiment illustrated in FIG. 5 (step S423). That is, the terminal signal demodulation unit 441 specifies the wireless communication scheme used by the terminal station 3 for transmission of the terminal uplink signal on the basis of information specific to the wireless communication scheme included in the received signal represented by the waveform data. The terminal signal demodulation unit 441 demodulates the received signal represented by the waveform data in accordance with the specified wireless communication scheme, and outputs a symbol obtained by the demodulation to the terminal signal decoding unit 442. The terminal signal decoding unit 442 decodes the symbol input from the terminal signal demodulation unit 441 according to the specified wireless communication scheme, and obtains the terminal transmission data transmitted from the terminal station 3. Note that the terminal signal decoding unit 442 can also use a decoding scheme with a large calculation load, such as SIC. The base station 4a repeats the processing from step S421.

According to the wireless communication system 1a according to the present modification, the mobile relay station 2a can collectively transmit the data received from the plurality of terminal stations 3 and accumulated, with high quality in a short time at a timing at which communication with the base station 4a is possible.

Modification 2 of First Embodiment

In a present modification, a mobile relay station receives a terminal uplink signal through a plurality of antennas, and transmits a terminal downlink signal through a plurality of antennas. Hereinafter, differences from Modification 1 of the first embodiment will be mainly described.

Figure 9:
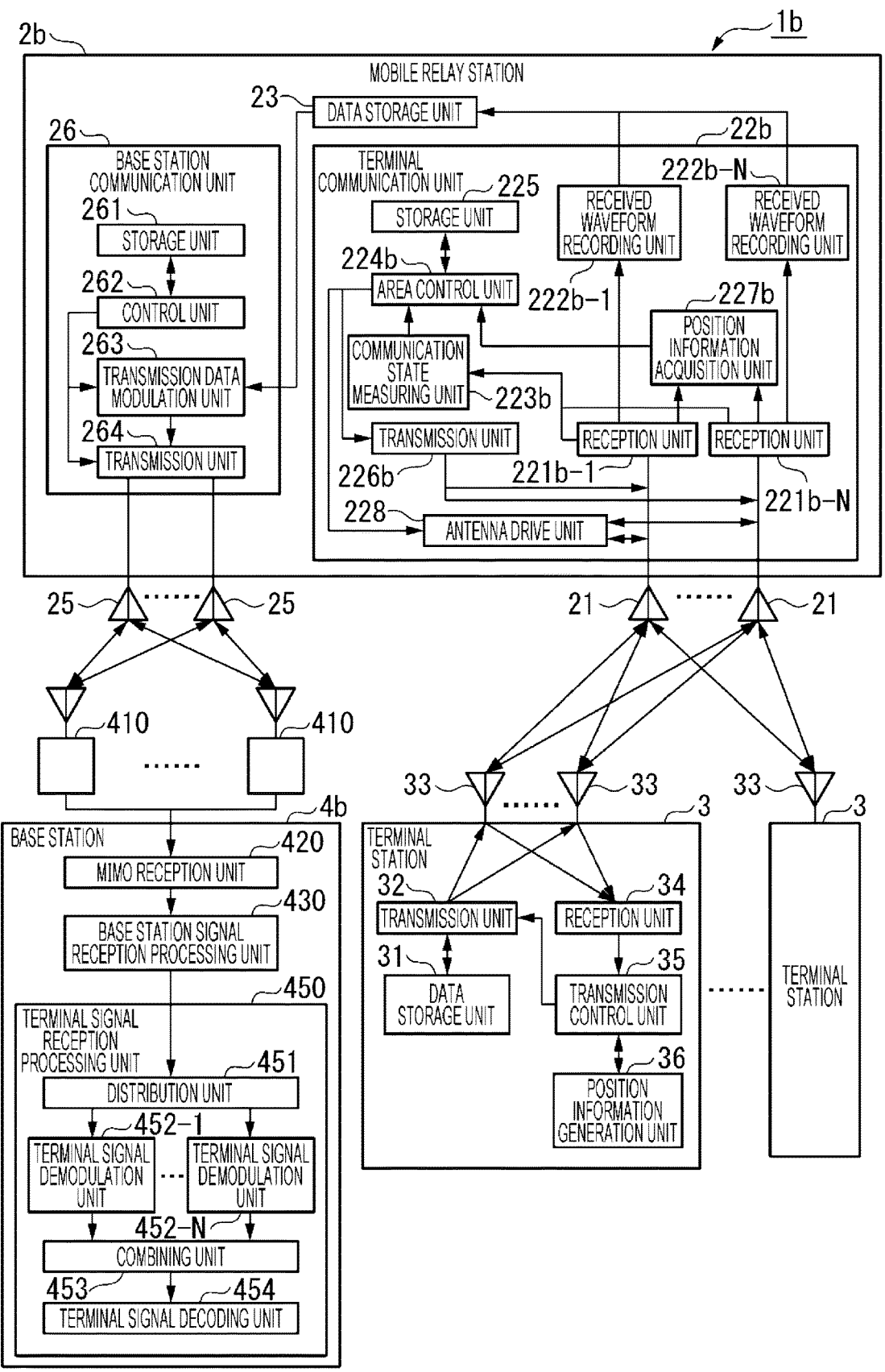
FIG. 9 is a configuration diagram of a wireless communication system according to Modification 2 of the first embodiment of the present invention.

FIG. 9 is a configuration diagram of a wireless communication system 1b according to Modification 2 of the first embodiment. In the figure, the same components as those of the wireless communication system 1a in Modification 1 of the first embodiment illustrated in FIG. 7 are denoted by the same reference numerals, and the description thereof will be omitted. The wireless communication system 1b includes a mobile relay station 2b, the terminal station 3, and a base station 4b.

The mobile relay station 2b includes N antennas 21 (N is an integer greater than or equal to 2), a terminal communication unit 22b, the data storage unit 23, the base station communication unit 26, and the plurality of antennas 25. The N antennas 21 are referred to as antennas 21-1 to 21-N, respectively.

The terminal communication unit 22b includes N reception units 221b and N received waveform recording units 222b. The N reception units 221b are referred to as reception units 221b-1 to 221b-N, and the N received waveform recording units 222b are referred to as received waveform recording units 222b-1 to 222b-N. The reception unit 221b-n (n is an integer greater than or equal to 1 and less than or equal to N) receives the terminal uplink signal through the antenna 21-n. The received waveform recording unit 222b-n samples a received waveform of the terminal uplink signal received by the reception unit 221b-n, and generates waveform data indicating a value obtained by the sampling. The received waveform recording unit 222b-n writes received waveform information including an antenna identifier of the antenna 21-n, a reception time of the terminal uplink signal at the antenna 21-$n$, and the generated waveform data in the data storage unit 23. The antenna identifier is information for specifying the antenna 21-$n$. The data storage unit 23 stores received waveform information including waveform data of the terminal uplink signal received by each of the antennas 21-1 to 21-N.

The base station 4$b$ includes the plurality of antenna stations 410, the MIMO reception unit 420, the base station signal reception processing unit 430, and a terminal signal reception processing unit 450.

The terminal signal reception processing unit 450 performs processing of receiving the terminal uplink signal indicated by the received waveform information. At this time, the terminal signal reception processing unit 450 performs reception processing according to the wireless communication scheme used for transmission by the terminal station 3 to acquire the terminal transmission data. The terminal signal reception processing unit 450 includes a distribution unit 451, N terminal signal demodulation units 452, a combining unit 453, and a terminal signal decoding unit 454. The N terminal signal demodulation units 452 are referred to as terminal signal demodulation units 452-1 to 452-N, respectively.

The distribution unit 451 reads the waveform data of the same reception time from the received waveform information, and outputs the read waveform data to the terminal signal demodulation units 452-1 to 452-N depending on the antenna identifier associated with the waveform data. That is, the distribution unit 451 outputs the waveform data associated with the antenna identifier of the antenna 21-$n$ to the terminal signal demodulation unit 452-$n$. Each of the terminal signal demodulation units 452-1 to 452-N demodulates a signal represented by the waveform data, and outputs a symbol obtained by the demodulation to the combining unit 453. The terminal signal demodulation unit 452-$n$ may demodulate the signal represented by the waveform data after performing processing of compensating for the Doppler shift of the terminal uplink signal received by the antenna 21-$n$ of the mobile relay station 2. The Doppler shift received by the terminal uplink signal received by each antenna 21-$n$ is calculated in advance on the basis of the position of the terminal station 3 and the orbit information on the LEO on which the mobile relay station 2$b$ is mounted. The combining unit 453 adds and combines the symbols input from the respective terminal signal demodulation units 452-1 to 452-N, and outputs an added and combined symbol to the terminal signal decoding unit 454. The terminal signal decoding unit 454 decodes the added and combined symbol to obtain the terminal transmission data transmitted from the terminal station 3.

In addition, as illustrated in FIG. 9, the mobile relay station 2$b$ further includes a communication state measuring unit 223$b$, an area control unit 224$b$, the storage unit 225, a transmission unit 226$b$, and a position information acquisition unit 227$b$.

The communication state measuring unit 223$b$ measures communication states of terminal uplink communications from the plurality of terminal stations 3 in the reception units 221$b$-1 to 221$b$-N. The communication state measuring unit 223$b$ generates information (congestion degree information) indicating the congestion degree of communication on the basis of a measurement result. For example, the communication state measuring unit 223$b$ measures the number of accesses of terminal uplink communication per unit time from the plurality of terminal stations 3 or the received signal strength of the frequency band of the terminal uplink communication, in the reception units 221$b$-1 to 221$b$-N, and generates the congestion degree information.

Note that the congestion degree information may or may not be information itself indicating the number of accesses of terminal uplink communication per unit time from the plurality of terminal stations 3 or the received signal strength of the frequency band of the terminal uplink communication. For example, the congestion degree information may be information indicating a level determined on the basis of whether or not information is within a predetermined threshold range, the information indicating the number of accesses of terminal uplink communication per unit time from the plurality of terminal stations 3 or the received signal strength of the frequency band of the terminal uplink communication. In this case, information in which a range of a value of the number of accesses or the received signal strength is associated with a level is stored in advance in the storage unit 225 or the like, for example.

The position information acquisition unit 227$b$ acquires position information on each terminal station 3. The position information is included in the terminal uplink signal transmitted from each terminal station 3 and received by the reception units 221$b$-1 to 221$b$-N.

The area control unit 224$b$ controls a timing at which the terminal downlink signal including the transmission permission signal is transmitted to the terminal station 3. The area control unit 224$b$ acquires congestion degree information generated by the communication state measuring unit 223$b$. In addition, the area control unit 224$b$ acquires the position information indicating the position of each terminal station 3 acquired by the position information acquisition unit 227$b$.

The area control unit 224$b$ changes the scanning speed of the beam on the basis of the acquired congestion degree information. The area control unit 224$b$ may change the scanning speed of the beam on the basis of the acquired congestion degree information and position information. For example, the mobile relay station 2$b$ changes the scanning speed of the beam so that the congestion degrees of communication with the terminal stations 3 included in the divided small areas are made uniform in the plurality of small areas. The area control unit 224$b$ stores the area information on each small area in the storage unit 225.

The area control unit 224$b$ refers to the area information recorded in the storage unit 225, and generates a transmission permission signal to be transmitted toward a small area (a small area associated with the area information) of the emission range of the beam. The area control unit 224$b$ controls a timing at which the terminal downlink signal including the transmission permission signal is transmitted to the terminal station 3. The area control unit 224$b$ controls a changing speed of the emission direction of the beam (the scanning speed of the beam).

Here, the emission direction of the beam may be changed by the antenna drive unit 228 without changing the direction of the antennas 21. The antenna drive unit 228 changes the emission direction of the beam by using, for example, a phased array depending on the control by the area control unit 224. The beam is generated for each grouped antenna 21 group.

The transmission unit 226$b$ acquires the transmission permission signal generated by the area control unit 224$b$, and transmits the terminal downlink signal including the acquired transmission permission signal from the plurality of antennas 21 by wireless signals. The transmission unit 226$b$ transmits the signal by LPWA. The transmission unit 226$b$ determines a channel to be used for transmission of the terminal downlink signal by the mobile relay station 2 by a method determined in advance in a wireless communication scheme to be used. A timing at which the transmission unit 226b transmits the terminal downlink signal is controlled by the area control unit 224b.

The storage unit 225 stores the transmission start timing for each communication target area calculated in advance on the basis of the orbit information on the LEO satellite on which the mobile relay station 2b is mounted and a position of the communication target area. The area control unit 224b controls the transmission unit 226b to transmit the terminal downlink signal including the transmission permission signal to the ground at the transmission start timing for each communication target area stored in the storage unit 225.

The area control unit 224b determines an initial value of the scanning speed of the beam on the basis of, for example, the congestion degree of communication when terminal uplink signals are received from the plurality of terminal stations 3 in the communication target area in the past (for example, at a time point before one orbiting). Alternatively, the area control unit 224b may determine the initial value of the scanning speed of the beam on the basis of, for example, the congestion degree of communication when the terminal uplink signals are received from the plurality of terminal stations 3 in the communication target area in the same time zone in the past.

As illustrated in FIG. 9, the terminal station 3 further includes the reception unit 34, the transmission control unit 35, and the position information generation unit 36. The reception unit 34 receives the terminal downlink signal through the antenna 33. The transmission control unit 35 acquires the transmission permission signal from the terminal downlink signal received by the reception unit 34.

The position information generation unit 36 includes a positioning device such as a GPS receiver, for example, and specifies the position of the terminal station 3. The position information generation unit 36 generates position information indicating the specified position of the terminal station 3.

The transmission control unit 35 acquires the position information indicating the position of the terminal station 3 generated by the position information generation unit 36. The transmission control unit 35 determines whether or not the transmission permission signal is acquired. In a case where the transmission permission signal is not acquired by the transmission control unit 35, the terminal station 3 waits without starting transmission of the terminal uplink signal to the mobile relay station 2b.

In a case where the position of the terminal station 3 is included in the small area (in a case where the terminal station 3 is located in the emission range of the beam), the transmission control unit 35 causes the transmission unit 32 to start transmission of the terminal uplink signal. At this time, the transmission control unit 35 causes the transmission unit 32 to transmit the terminal uplink signal including data such as environmental data and the position information indicating the position of the terminal station 3 generated by the position information generation unit 36.

The transmission unit 32 transmits the terminal uplink signal. The transmission unit 32 reads sensor data, for example, environmental data and the like from the data storage unit 31 as terminal transmission data. The transmission unit 32 transmits the terminal uplink signal including the read terminal transmission data and the position information indicating the position of the terminal station 3 generated by the position information generation unit 36 from the antenna 33 by a wireless signal. The transmission unit 32 transmits the signal by LPWA.

The reception units 221b-1 to 221b-N of the mobile relay station 2b receive the terminal uplink signals through the antennas 21-1 to 21-N. The received waveform recording units 222b-1 to 222b-N sample received waveforms of the terminal uplink signals received by the reception units 221b-1 to 221b-N, and generate waveform data indicating values obtained by the sampling. The received waveform recording units 222b-1 to 222b-N write the received waveform information including the reception time of the terminal uplink signals in the antennas 21-1 to 21-N and the selected waveform data to the data storage unit 23. The data storage unit 23 stores the received waveform information written by the received waveform recording units 222b-1 to 222b-N.

Figure 10:
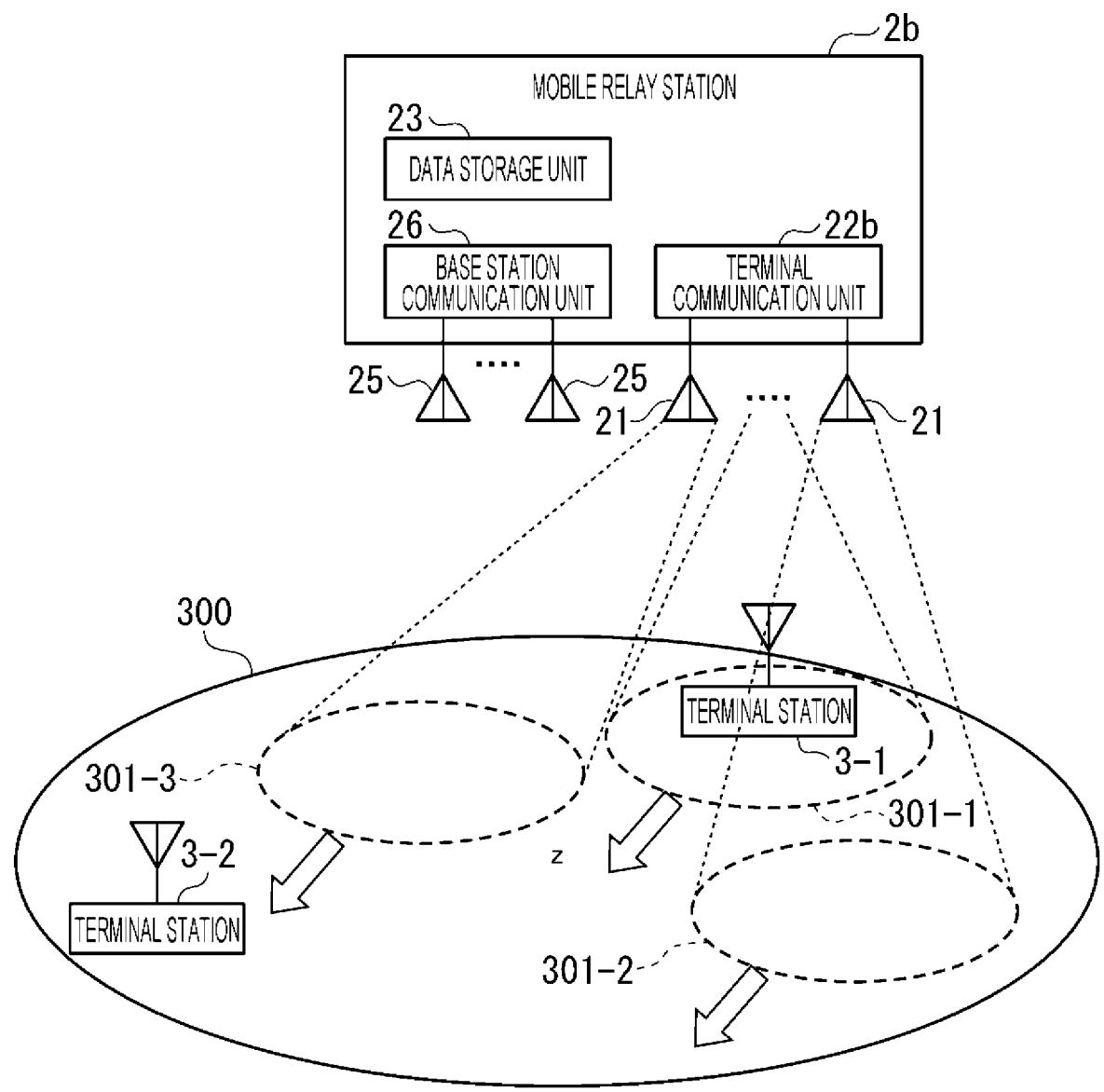
FIG. 10 is a diagram illustrating a beam scanning example according to the embodiment.

FIG. 10 is a diagram illustrating a beam scanning example. The plurality of antennas 21 constitute a multi-antenna element (massive antenna array). The number of antennas 21 is larger than the number of beams emitted to the communication target area 300. The plurality of antennas 21 are divided (grouped) into clusters in advance. In the plurality of antennas 21, beams are formed by beamforming for each cluster. The antenna drive unit 228 moves the position of the emission range 301 of each beam by controlling the emission direction of each beam by using multi-beam forming by the multi-antenna element. That is, the antenna drive unit 228 controls the plurality of antennas 21 by using the multi-beam forming by the multi-antenna element to scan the communication target area 300 with each beam. An arrow illustrated in FIG. 10 represents an example of a scanning direction.

The antenna drive unit 228 changes the scanning speed of the beam scanning the communication target area 300 on the basis of the congestion degree of communication. For example, the mobile relay station 2 changes the scanning speed so that the congestion degrees of communication with the terminal stations 3 included in each small area are made uniform in the plurality of small areas.

For example, in a case where the congestion degree of communication is greater than or equal to the threshold, the antenna drive unit 228 reduces the scanning speed of the beam. That is, the area control unit 224 sets the congestion degree (parameter) of communication in the antenna drive unit 228 to increase the emission time of the beam for the emission range 301 (small area) in which there is the terminal station 3 transmitting a large number of terminal uplink signals. As a result, it is possible to improve a gain of a signal transmitted from the terminal station 3 transmitting a large number of terminal uplink signals. In addition, in the case where the congestion degree of communication is greater than or equal to the threshold, the antenna drive unit 228 may temporarily set the scanning speed of the beam to 0. That is, in the case where the congestion degree of communication is greater than or equal to the threshold, the antenna drive unit 228 may temporarily stop scanning with the beam.

For example, in a case where the congestion degree of communication is less than the threshold, the antenna drive unit 228 increases the scanning speed of the beam. As a result, scanning of the communication target area 300 (all small areas) can be completed in a short time.

The antenna drive unit 228 may change the scanning speed of the beam scanning the communication target area 300 on the basis of the congestion degree of communication and the position information indicating the position of each of the plurality of terminal stations 3. For example, the mobile relay station 2 changes the scanning speed so that the congestion degrees of communication with the terminal stations 3 included in each small area and the positions of the respective plurality of terminal stations 3 are made uniform in the plurality of small areas.

For example, in a case where the congestion degree of communication and the number of pieces of position information are greater than or equal to thresholds, the antenna drive unit 228 reduces the scanning speed of the beam. That is, the area control unit 224 sets the congestion degree (parameter) of communication in the antenna drive unit 228 to increase the emission time of the beam for the emission range 301 (small area) in which there are a large number of terminal stations 3. As a result, it is possible to improve gains of the terminal uplink signals transmitted from a large number of terminal stations 3. In the case where the congestion degree of communication and the number of pieces of position information are greater than or equal to the thresholds, the antenna drive unit 228 may temporarily set the scanning speed of the beam to 0. That is, in the case where the congestion degree of communication and the number of pieces of position information are greater than or equal to the thresholds, the antenna drive unit 228 may temporarily stop scanning with the beam.

For example, in a case where the congestion degree of communication and the number of pieces of position information are less than the thresholds, the antenna drive unit 228 increases the scanning speed of the beam. As a result, scanning of the communication target area 300 (all small areas) can be completed in a short time.

The antenna drive unit 228 drives the antennas 21 to scan a plurality of small areas in the communication target area 300 with respective beams in a state where the emission ranges 301 of the beams are separated from each other. As a result, it is possible to prevent interference between the terminal uplink signals.

Operation of the wireless communication system 1b will be described.

Figure 11:
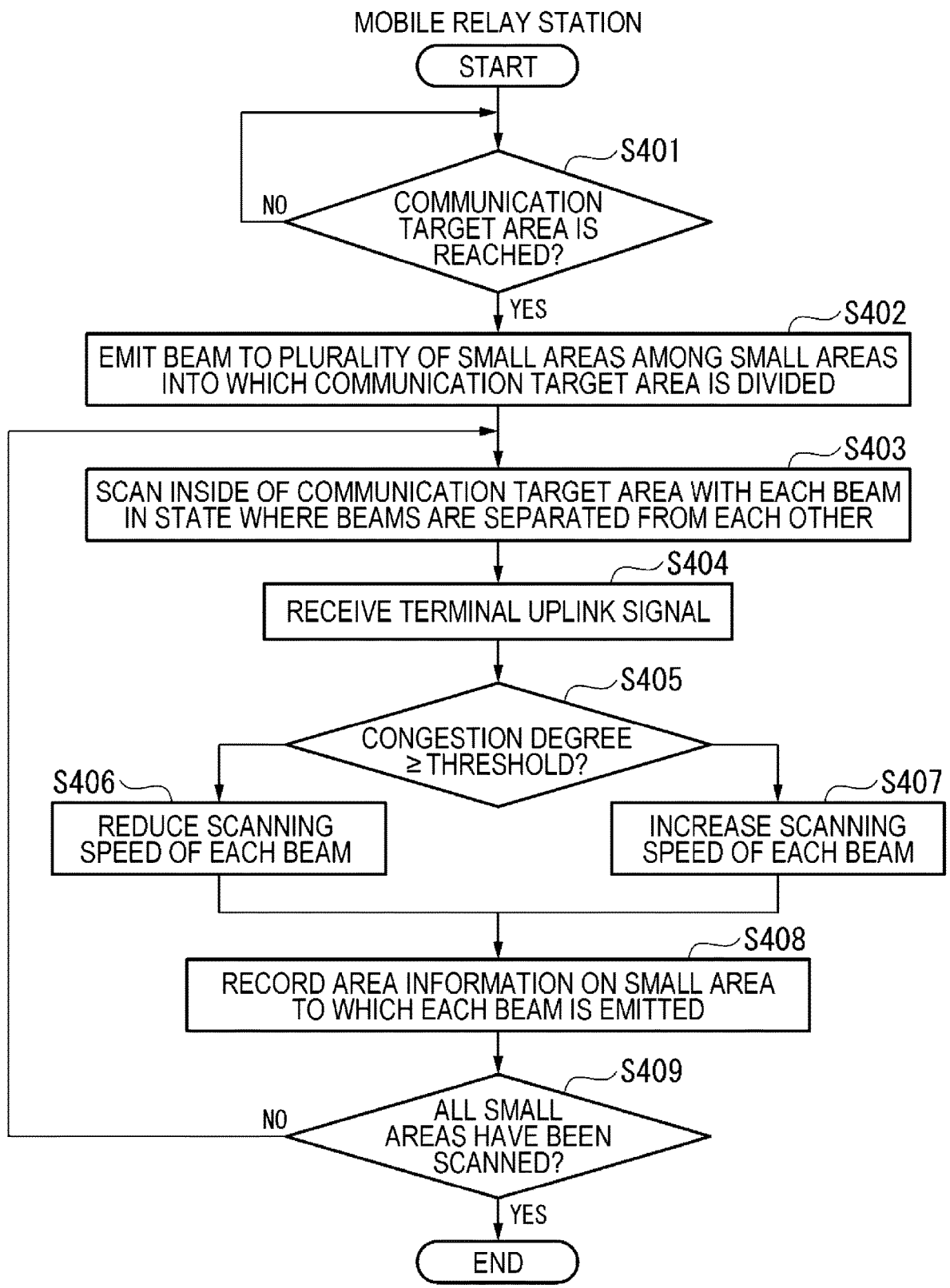
FIG. 11 is a flow diagram illustrating beam scanning processing according to the embodiment.

FIG. 11 is a flow diagram illustrating beam scanning processing. The area control unit 224 determines whether or not the mobile relay station 2 has arrived at a predetermined position where the beam can be emitted to the communication target area 300 (step S401). In a case where it is determined that the mobile relay station 2 has not arrived at the predetermined position (step S401: No), the area control unit 224 re-executes step S401 after a lapse of a predetermined time.

In a case where it is determined that the mobile relay station 2 has arrived at the predetermined position (step S401: Yes), the antenna drive unit 228 emits the beam to one or more small areas among the plurality of small areas into which the communication target area 300 is divided, by using the antennas 21 on the basis of the area information (step S402). The antenna drive unit 228 drives the antennas 21 to scan the inside of the communication target area 300 with each beam at a scanning speed depending on the congestion degree. Here, the antenna drive unit 228 drives the antennas 21 to scan the communication target area 300 with each beam in a state where the emission ranges 301 of the beams are separated from each other (step S403). The reception unit 221 receives the terminal uplink signals by using the antennas 21. The area control unit 224 derives a congestion degree of communication on the basis of the terminal uplink signals (step S404).

The antenna drive unit 228 determines whether or not the congestion degree of communication is greater than or equal to the threshold (step S405). In a case where it is determined that the congestion degree of communication is greater than or equal to the threshold (step S405: Yes), the antenna drive unit 228 drives the antennas 21 to reduce the scanning speeds of respective beams. The antenna drive unit 228 may temporarily stop scanning with each beam (step S406). In a case where it is determined that the congestion degree of communication is less than the threshold (step S405: No), the antenna drive unit 228 drives the antennas 21 to increase the scanning speeds of respective beams (step S407).

The antenna drive unit 228 records the area information on the small area to which the beam is emitted (the small area overlapping at least a part of the emission range 301) in the storage unit 225 for each small area as information on a scanned small area (step S408). As a result, the antenna drive unit 228 can distinguish the scanned small area and an unscanned small area in the communication target area 300.

The antenna drive unit 228 determines whether or not all the small areas in the communication target area 300 have been scanned (step S409). In a case where it is determined that there is an unscanned small area (step S409: No), the antenna drive unit 228 returns the processing to step S403. In a case where it is determined that all the small areas have been scanned (step S409: Yes), the antenna drive unit 228 ends the processing illustrated in FIG. 11.

Figure 12:
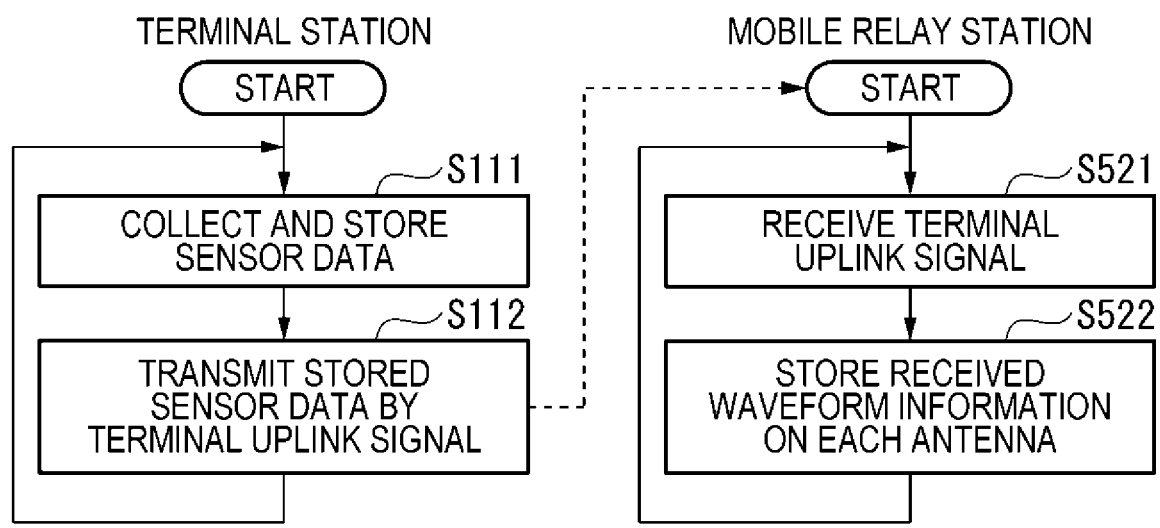
FIG. 12 is a flow diagram illustrating data collection processing performed by the wireless communication system according to the modification.

FIG. 12 is a flow diagram illustrating processing performed by the wireless communication system 1b in a case where a terminal uplink signal is transmitted from the terminal station 3 to the mobile relay station 2b. In the figure, the same processing as that in the processing flow of the first embodiment illustrated in FIG. 4 is denoted by the same reference numeral. The terminal station 3 performs processing similar to the processing of steps S111 to S112 in the processing flow of the first embodiment illustrated in FIG. 4. Note that the terminal station 3 may perform transmission with another terminal station 3 by time division multiplexing, OFDM, MIMO, or the like.

The reception units 221b-1 to 221b-N of the mobile relay station 2b receive the terminal uplink signal transmitted from the terminal station 3 (step S521). Depending on the wireless communication scheme of the terminal station 3 as a transmission source, there are a case where the terminal uplink signal is received from only one terminal station 3 in a time division manner at the same frequency and a case where the terminal uplink signals are simultaneously received from a plurality of terminal stations 3 at the same frequency. The received waveform recording unit 222b-n writes, in the data storage unit 23, the received waveform information in which the waveform data representing the waveform of the terminal uplink signal received by the reception unit 221b-n, the reception time, and the antenna identifier of the antenna 21-n are associated with each other (step S522). The mobile relay station 2b repeats the processing from step S521.

The processing performed by the wireless communication system 1b in the case of transmitting the base station downlink signal from the mobile relay station 2b to the base station 4 is similar to that of the processing flow of Modification 1 of the first embodiment illustrated in FIG. 8 except for the following processing. That is, in step S423, the terminal signal reception processing unit 450 performs processing of receiving the terminal uplink signal indicated by the received waveform information. Specifically, the distribution unit 451 reads waveform data having the same reception time from the received waveform information, and outputs the read waveform data to the terminal signal demodulation units 452-1 to 452-N depending on the antenna identifier associated with the waveform data. Each of the terminal signal demodulation units 452-1 to 452-N specifies the wireless communication scheme used by the terminal station 3 for transmission of the terminal uplink signal on the basis of information specific to the wireless communication scheme included in the received signal represented by the waveform data. The terminal signal demodulation units 452-1 to 452-N demodulate the received signals represented by the waveform data in accordance with the specified wireless communication schemes, and output symbols obtained by the demodulation to the combining unit 453.

The combining unit 453 adds and combines the symbols input from the respective terminal signal demodulation units 452-1 to 452-N. By the addition and combination, the signal transmitted by the terminal station 3 is emphasized because of the correlation, but influence of randomly added noise is reduced. For that reason, a diversity effect can be obtained for terminal uplink signals simultaneously received only from one terminal station 3 by the mobile relay station 2b. In addition, for terminal uplink signals simultaneously received from a plurality of terminal stations 3 by the mobile relay station 2b, it corresponds to performing MIMO communication. The combining unit 453 outputs an added and combined symbol to the terminal signal decoding unit 454. The terminal signal decoding unit 454 decodes the symbol added and combined by the combining unit 453 according to the specified wireless communication scheme to obtain the terminal transmission data transmitted from the terminal station 3. Note that the terminal signal decoding unit 454 can also use a decoding scheme with a large calculation load, such as SIC.

Figure 13:
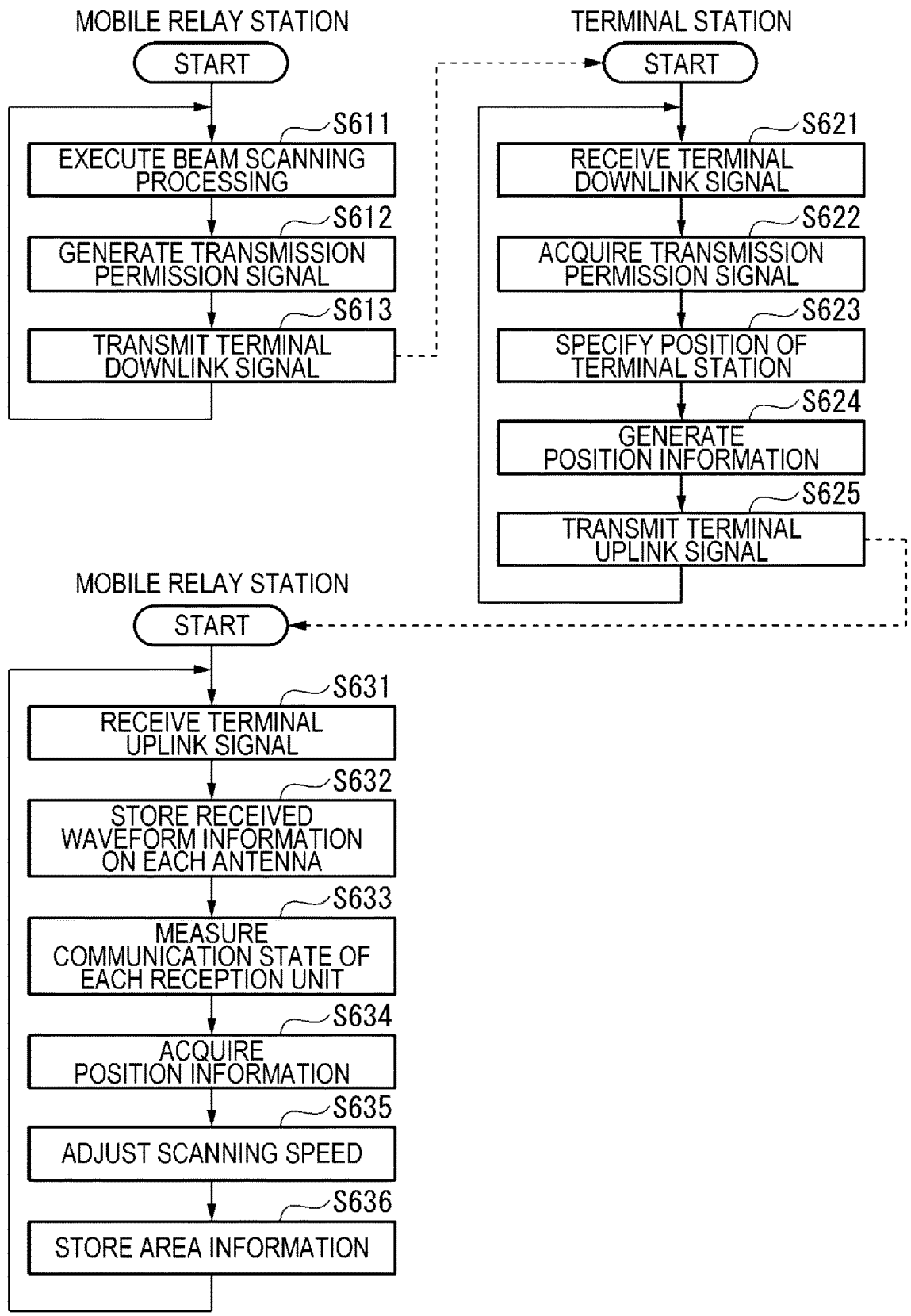
FIG. 13 is a flow diagram illustrating transmission control processing performed by the wireless communication system according to the modification.

FIG. 13 is a flow diagram illustrating transmission control processing performed by the wireless communication system 1b. The area control unit 224b of the mobile relay station 2 uses the antenna drive unit 228 to execute beam scanning processing (step S611). The area control unit 224b of the mobile relay station 2b generates a transmission permission signal (step S612). Note that the transmission unit 226b acquires the transmission permission signal generated by the area control unit 224b, and transmits the terminal downlink signal including the acquired transmission permission signal from the antennas 21-1 to 21-N by a wireless signal (step S613). The mobile relay station 2b repeats the processing from step S611.

The reception unit 34 of the terminal station 3 receives the terminal downlink signal through the antenna 33 (step S621). The transmission control unit 35 of the terminal station 3 acquires the transmission permission signal from the terminal downlink signal received by the reception unit 34 (step S622).

The position information generation unit 36 of the terminal station 3 specifies the position of the terminal station 3 (step S623). The position information generation unit 36 generates position information indicating the specified position of the terminal station 3. The transmission control unit 35 acquires the position information indicating the position of the terminal station 3 generated by the position information generation unit 36 (step S624).

The transmission control unit 35 causes the transmission unit 32 to start transmission of the terminal uplink signal. At this time, the transmission control unit 35 causes the transmission unit 32 to transmit the terminal uplink signal including data such as environmental data and the position information indicating the position of the terminal station 3 generated by the position information generation unit 36. The transmission unit 32 transmits the terminal uplink signal (step S625). The terminal station 3 repeats the processing from step S621.

The reception units 221b-1 to 221b-N of the mobile relay station 2b receive the terminal uplink signals through the antennas 21-1 to 21-N (step S631). The received waveform recording units 222b-1 to 222b-N of the mobile relay station 2b sample received waveforms of the terminal uplink signals received by the reception units 221b-1 to 221b-N, and generate waveform data indicating values obtained by the sampling. The received waveform recording units 222b-1 to 222b-N write the received waveform information including the reception time of the terminal uplink signals in the antennas 21-1 to 21-N and the selected waveform data to the data storage unit 23. The data storage unit 23 stores the received waveform information written by the received waveform recording units 222b-1 to 222b-N (step S632).

The communication state measuring unit 223b of the mobile relay station 2b measures communication states of terminal uplink communications from the plurality of terminal stations 3 in the reception units 221b-1 to 221b-N (step S633), and generates information (congestion degree information) indicating the congestion degree of the communication. The position information acquisition unit 227b of the mobile relay station 2b acquires position information on each terminal station 3 (step S334). The position information is included in the terminal uplink signal transmitted from each terminal station 3 and received by the reception units 221b-1 to 221b-N.

The area control unit 224b adjusts the scanning speed of the beam on the basis of the acquired congestion degree information and position information (step S635). As described above, for example, the mobile relay station 2b adjusts the scanning speed so that the congestion degrees of communication with the terminal stations 3 included in the divided small areas are made uniform among the plurality of small areas. The area control unit 224b stores the area information on the small area scanned with the beam in the storage unit 225 (step S636). The mobile relay station 2b repeats the processing from step S631.

As described above, according to the wireless communication system 1 according to Modification 2 of the first embodiment, the antenna drive unit 228 drives one or more antennas 21 by using, for example, a phased array to scan the inside of the communication target area 300 with each beam at a scanning speed depending on the congestion degree. In a case where the congestion degree is greater than or equal to the threshold, the antenna drive unit 228 drives one or more antennas 21 to reduce the scanning speed. In a case where the congestion degree is less than the threshold, the antenna drive unit 228 drives the antennas 21 to increase the scanning speed. The antenna drive unit 228 may drive one or more antennas 21 to scan the plurality of small areas with one or more beams in a state where the emission ranges 301 are separated from each other.

According to the present modification, the mobile relay station 2b receives the terminal uplink signal transmitted from the terminal station 3 by diversity reception, MIMO reception, or the like. Thus, according to the wireless communication system 1b according to the present modification, it is possible to improve the link budget of communication between the mobile relay station 2b and the terminal station 3.

Second Embodiment

A second embodiment is different from the first embodiment in that a plurality of mobile relay stations cooperate with each other. In the second embodiment, differences from the first embodiment will be mainly described.

In the wireless communication system 1 (1a, 1b) according to the first embodiment described above, one mobile relay station 2 sequentially transmits a transmission permission signal to each of a plurality of small areas into which a communication target area is divided. On the other hand, a wireless communication system 1c according to the present embodiment includes a plurality of mobile relay stations 2c. The wireless communication system 1c performs processing of allocating a small area to any of the mobile relay stations 2c (Hereinafter, it is referred to as "allocation processing"). Each mobile relay station 2c transmits a terminal downlink signal to the terminal station 3 located in the emission range of the beam by executing beam scanning processing on the small area allocated to the mobile relay station 2c.

With such a configuration, it is possible to perform control so that the plurality of mobile relay stations 2c shares and (for example, evenly) receives the terminal uplink signals transmitted from the plurality of terminal stations 3 existing in the communication target area. As a result, the wireless communication system 1c according to the present embodiment can alleviate the congestion degree of communication in each mobile relay station 2c, and can suppress a decrease in reliability of communication even in a case where the congestion degree of communication fluctuates.

Figure 14:
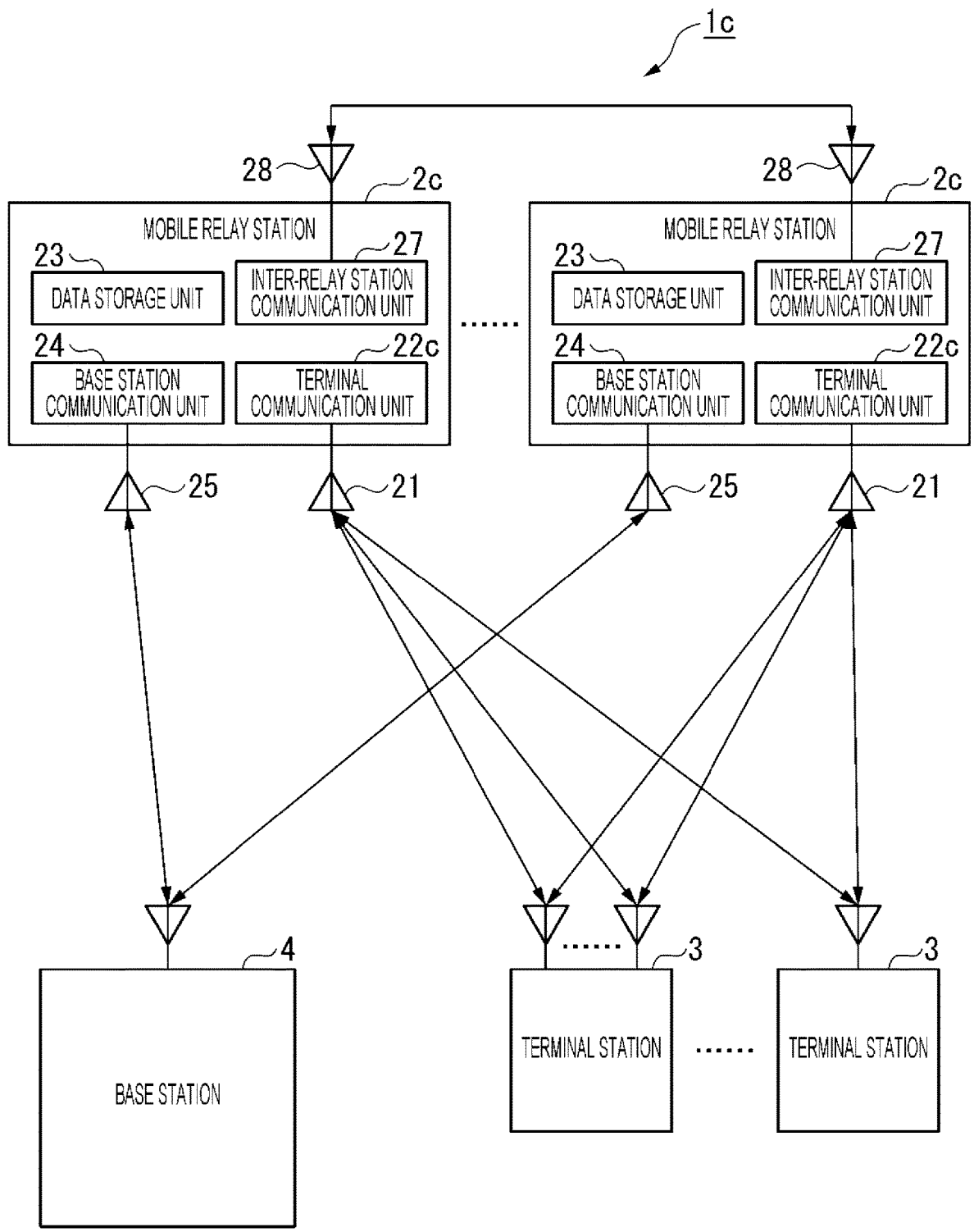
FIG. 14 is a configuration diagram of a wireless communication system according to a second embodiment of the present invention.

FIG. 14 is a configuration diagram of the wireless communication system 1c according to the second embodiment. In the figure, the same components as those of the wireless communication system 1 in the first embodiment illustrated in FIG. 1 are denoted by the same reference numerals, and the description thereof will be omitted. The wireless communication system 1c includes the plurality of mobile relay stations 2c, the terminal station 3, and the base station 4a. The number of plurality of mobile relay stations 2c, the number of terminal stations 3, and the number of base stations 4 included in the wireless communication system 1c are arbitrary, but it is assumed that the number of terminal stations 3 is large. The wireless communication system 1c is a communication system that transmits information for which immediacy is not required. Pieces of information respectively transmitted from the plurality of terminal stations 3 are transmitted via any of the plurality of mobile relay stations 2c and collected by the base station 4.

The mobile relay stations 2c are examples of a relay device whose communicable area moves with a lapse of time. The plurality of mobile relay stations 2c is respectively mounted on separate mobile bodies. The mobile relay stations 2c are included in, for example, LEO satellites. The plurality of LEO satellites, for example, make a formation flight on a low earth orbit. The terminal station 3 and the base station 4 are installed on the earth such as on the ground or on the sea. The terminal station 3 is, for example, an IoT terminal. The terminal station 3 collects data such as environmental data detected by a sensor and transmits the collected data to the mobile relay stations 2c by a wireless signal. In the figure, only two terminal stations 3 are illustrated. The mobile relay stations 2c receive data transmitted from each of the plurality of terminal stations 3 by a wireless signal while moving above the earth. The mobile relay stations 2c accumulate the received data and wirelessly transmits the accumulated data collectively to the base station 4 at a timing at which communication with the base station 4 is possible. The base station 4 receives the data collected by the terminal stations 3 from the mobile relay stations 2c.

The mobile relay stations 2c each include the antenna 21, a terminal communication unit 22c, the data storage unit 23, the base station communication unit 24, the antenna 25, an inter-relay station communication unit 27, and an antenna 28.

Note that, in the present embodiment, as an example, it is assumed that a specific mobile relay station 2c (Hereinafter, it is referred to as a "mobile relay station 2c serving as a host".) among the plurality of mobile relay stations 2c performs processing (allocation processing) of allocating each of the plurality of small areas to any of the plurality of mobile relay stations 2c.

The terminal communication unit 22c of the mobile relay station 2c serving as the host measures communication states of terminal uplink communications from the plurality of terminal stations 3. The terminal communication unit 22c generates information (congestion degree information) indicating the congestion degree of communication on the basis of a measurement result. For example, the terminal communication unit 22c measures the number of accesses of terminal uplink communication per unit time from the plurality of terminal stations 3 or the received signal strength of the frequency band of the terminal uplink communication.

Note that the congestion degree information may be information itself indicating the number of accesses of terminal uplink communication per unit time from the plurality of terminal stations 3 or the received signal strength of the frequency band of the terminal uplink communication. Alternatively, the congestion degree information may be information indicating a level determined on the basis of whether or not information is within a predetermined threshold range, the information indicating the number of accesses of terminal uplink communication per unit time from the plurality of terminal stations 3 or the received signal strength of the frequency band of the terminal uplink communication.

In addition, the terminal communication unit 22c acquires position information indicating the position of the terminal station 3 included in the terminal uplink communication transmitted from the plurality of terminal stations 3.

The terminal communication unit 22c adjusts the scanning speed of the beam on the basis of the acquired congestion degree information and position information. For example, the terminal communication unit 22c adjusts the scanning speed of the beam so that the congestion degrees of communication with the terminal stations 3 included in the divided small areas are made uniform among the plurality of small areas.

Further, the terminal communication unit 22c performs processing (allocation processing) of allocating each of the plurality of small areas into which the communication target area is divided to any of the plurality of mobile relay stations 2c. For example, the terminal communication unit 22c performs control so that the plurality of mobile relay stations 2c shares and (for example, evenly) receives the terminal uplink signals transmitted from the plurality of terminal stations 3 existing in the communication target area. The terminal communication unit 22c generates allocation information indicating a result of the allocation processing. The allocation information is information in which area information indicating a small area is associated with information for identifying the mobile relay station 2c allocated to the small area.

The inter-relay station communication units 27 of the respective mobile relay stations 2c can perform data transmission and reception (inter-satellite communication) to and from each other via the antennas 28. Note that, for communication between the mobile relay stations 2c, for example, a 23 GHz band communication band is used.

The inter-relay station communication unit 27 of the mobile relay station 2c serving as the host transmits the allocation information generated by the terminal communication unit 22c to the other mobile relay stations 2c. As a result, the plurality of mobile relay stations 2c can share the allocation information. On the basis of the shared allocation information, each mobile relay station 2c can recognize the small area allocated to the mobile relay station 2c.

The terminal communication unit 22c of the mobile relay station 2c that has recognized the small area allocated to the mobile relay station 2c generates a transmission permission signal at a timing when communication becomes possible for the small area. As described above, the transmission permission signal is a control signal indicating that the terminal station 3 is permitted to transmit data such as environmental data to the mobile relay station 2c of the terminal station 3.

The terminal communication unit 22c transmits the terminal downlink signal including the generated transmission permission signal from the antenna 21 by a wireless signal. The terminal communication unit 22c transmits the signal by LPWA, for example. The terminal communication unit 22c determines a channel to be used for transmission of the terminal downlink signal by the mobile relay station 2c by a method determined in advance in a wireless communication scheme to be used.

The terminal communication unit 22c stores the transmission start timing for each small area calculated in advance on the basis of the orbit information on the LEO satellite on which the mobile relay station 2c is mounted and the position of each small area. The orbit information on the LEO is information from which it is possible to obtain a position, speed, movement direction, and the like of the LEO satellite at an arbitrary time. A transmission time may be represented by, for example, an elapsed time from the transmission start timing. The terminal communication unit 22c transmits the terminal downlink signal including the transmission permission signal toward the ground at the transmission start timing of the small area as a communication target.

The terminal communication unit 22c executes beam scanning processing on the basis of the congestion degree of communication when the terminal uplink signals are received in the communication target area.

Note that, in the present embodiment, the mobile relay station 2c serving as the host is configured to transmit the allocation information itself to the other mobile relay stations 2c, but the present embodiment is not limited thereto. For example, the mobile relay station 2c serving as the host may be configured to transmit only the area information corresponding to each of the other mobile relay stations 2c.

Note that, in the present embodiment, a specific mobile relay station 2c serving as the host is configured to perform allocation processing, but the present embodiment is not limited thereto. For example, in the plurality of mobile relay stations 2c, the mobile relay station 2c serving as the host may be switched on the basis of a time zone, a position, or the like. Alternatively, for example, the base station 4 may be configured to acquire the congestion degree information and the position information (or the area information) indicating the position of the terminal station 3 from at least one mobile relay station 2c and perform the allocation processing. In this case, for example, the base station 4 transmits the allocation information generated by the allocation processing to the plurality of mobile relay stations 2c.

Operation of the wireless communication system 1c will be described.

Figure 15:
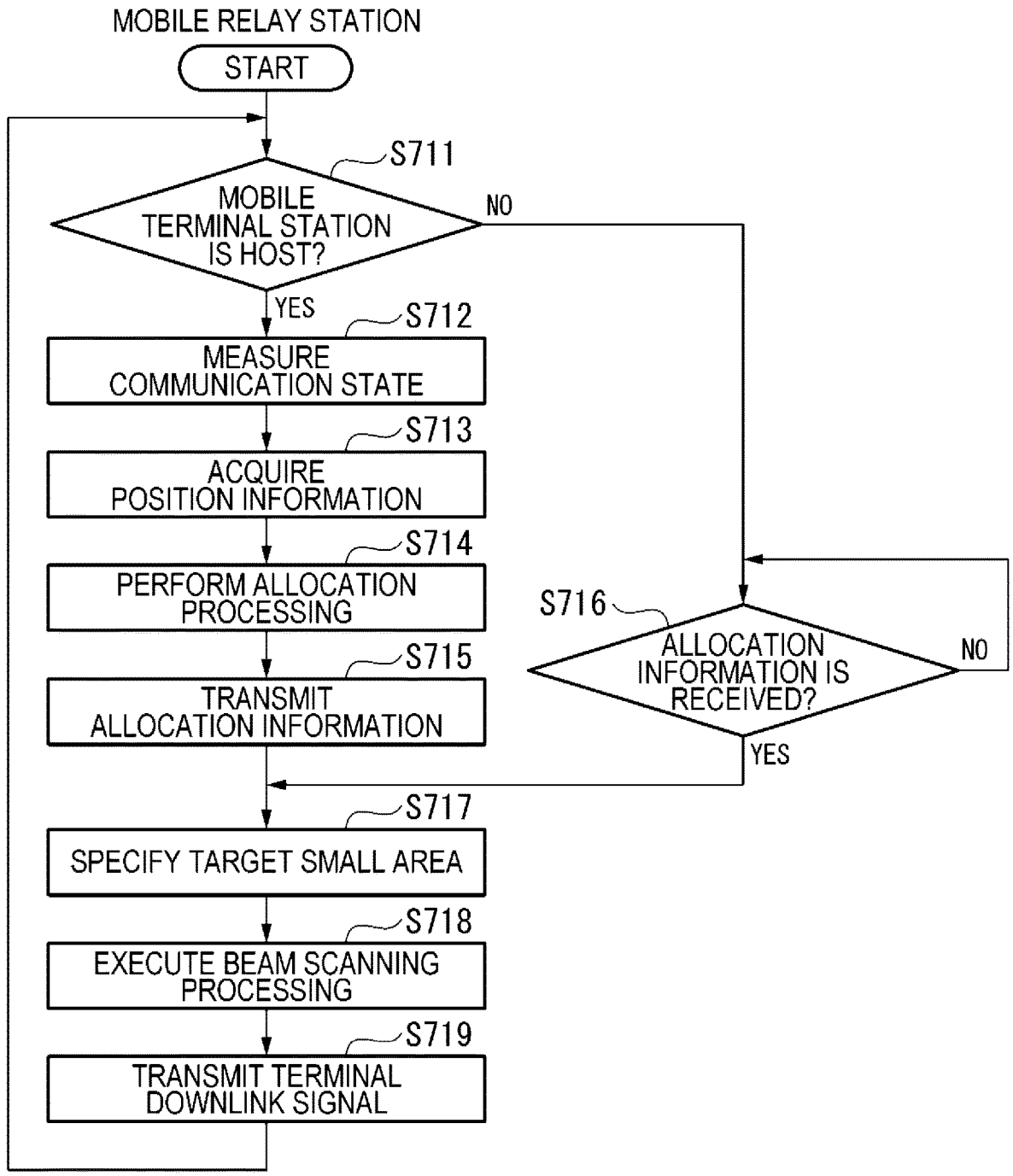
FIG. 15 is a flow diagram illustrating transmission control processing performed by the wireless communication system according to the embodiment.

FIG. 15 is a flow diagram illustrating allocation processing performed by the mobile relay station 2c serving as the host.

In a case where the mobile relay station 2c serves as the host (step S711: Yes), the terminal communication unit 22c of the mobile relay station 2c measures communication states of terminal uplink communications from the plurality of terminal stations 3 (step S712). Note that information for determining whether or not the mobile relay station 2c is the host is stored in the terminal communication unit 22c in advance, for example. Alternatively, the base station 4 may notify the mobile relay station 2c of the information for determining whether or not the mobile relay station 2c is the host as needed.

The terminal communication unit 22c generates information (congestion degree information) indicating the congestion degree of communication on the basis of a measurement result. As described above, for example, the terminal communication unit 22c measures the number of accesses of terminal uplink communication per unit time from the plurality of terminal stations 3 or the received signal strength of the frequency band of the terminal uplink communication. Note that, as described above, the congestion degree information may be information itself indicating the number of accesses of terminal uplink communication per unit time from the plurality of terminal stations 3 or the received signal strength of the frequency band of the terminal uplink communication. Alternatively, the congestion degree information may be information indicating a level determined on the basis of whether or not information is within a predetermined threshold range, the information indicating the number of accesses of terminal uplink communication per unit time from the plurality of terminal stations 3 or the received signal strength of the frequency band of the terminal uplink communication.

In addition, the terminal communication unit 22c acquires position information indicating the position of the terminal station 3 included in the terminal uplink communication transmitted from the plurality of terminal stations 3 (step S713).

The terminal communication unit 22c performs processing (allocation processing) of allocating each of the plurality of small areas into which the communication target area is divided to any of the plurality of mobile relay stations 2c (step S714). For example, the terminal communication unit 22c performs control so that the plurality of mobile relay stations 2c shares and (for example, evenly) receives the terminal uplink signals transmitted from the plurality of terminal stations 3 existing in the communication target area. The terminal communication unit 22c generates allocation information indicating a result of the allocation processing. As described above, the allocation information is information in which area information indicating a small area is associated with information for identifying the mobile relay station 2c allocated to the small area.

The inter-relay station communication unit 27 of the mobile relay station 2c transmits the allocation information generated by the terminal communication unit 22c to the other mobile relay stations 2c (step S715).

The terminal communication unit 22c of the mobile relay station 2c specifies a small area allocated to the mobile relay station 2c on the basis of the allocation information (step S716). The terminal communication unit 22c executes allocation processing for the small area on the basis of the acquired congestion degree information and position information (step S714). The terminal communication unit 22c generates a transmission permission signal at a timing when communication becomes possible for the small area. The terminal communication unit 22c transmits the terminal downlink signal including the generated transmission permission signal from the antenna 21 by a wireless signal (step S719). The terminal communication unit 22c transmits the terminal downlink signal including the transmission permission signal toward the ground at the transmission start timing of the small area as a communication target.

The terminal communication unit 22c executes beam scanning processing on the basis of the congestion degree of communication when the terminal uplink signals are received in the same communication target area. The mobile relay station 2c serving as the host repeats the processing from step S711.

On the other hand, in a case where the mobile relay station 2c is not the host (step S711: No), the terminal communication unit 22c of the mobile relay station 2c waits for reception of the allocation information transmitted from the mobile relay station 2c serving as the host (step S716). In a case where the allocation information is received (step S716: Yes), the terminal communication unit 22c specifies a small area allocated to the mobile relay station 2c on the basis of the allocation information (step S717). The terminal communication unit 22c executes beam scanning processing on the basis of the congestion degree of communication when the terminal uplink signals are received (step S718). The terminal communication unit 22c generates a transmission permission signal at a timing when communication becomes possible for the small area. The terminal communication unit 22c transmits the terminal downlink signal including the generated transmission permission signal from the antenna 21 by a wireless signal (step S719). The terminal communication unit 22c transmits the terminal downlink signal including the transmission permission signal toward the ground at the transmission start timing of the small area as a communication target.

The mobile relay station 2c that is not the host repeats the processing from step S711.

As described above, the wireless communication system 1c according to the second embodiment performs processing (allocation processing) of allocating each of the plurality of small areas to any of the plurality of mobile relay stations 2c. Each mobile relay station 2c transmits a transmission permission signal to the small area allocated to the mobile relay station 2c. With such a configuration, it is possible to perform control so that the plurality of mobile relay stations 2c shares and (for example, evenly) receives the terminal uplink signals transmitted from the plurality of terminal stations 3 existing in the communication target area. As a result, the wireless communication system 1c according to the present embodiment can alleviate the congestion degree of communication in each mobile relay station 2c, and can suppress a decrease in reliability of communication even in a case where the congestion degree of communication fluctuates.

In addition, each mobile relay station 2c includes the transmission permission signal in the terminal downlink signal and transmits the signal to the terminal station 3. The terminal station 3 acquires the transmission permission signal indicated by the received terminal downlink signal, and determines whether or not to start transmission of the terminal uplink signal to the mobile relay station 2c on the basis of the transmission permission signal. With such a configuration, the wireless communication system 1c can control the transmission timing of the terminal uplink signal from the terminal station 3 to the mobile relay station 2c. With such a configuration, the wireless communication system 1c can transmit sensor data transmitted from a larger number of terminal stations 3 to the base station 4 via the mobile relay station 2c while suppressing a decrease in reliability of communication even in a case where the congestion degree of communication fluctuates.

Third Embodiment

A third embodiment is different from the first embodiment and the second embodiment in that each of terminal stations 3d located in the emission range 301 of the beam autonomously controls the transmission timing of the terminal uplink signal. In the third embodiment, differences from the first embodiment and the second embodiment will be mainly described.

In the wireless communication system 1 (1a, 1b, 1c) according to the first embodiment and the second embodiment described above, the mobile relay station 2 (2a, 2b, 2c) is configured to receive terminal uplink signals transmitted from the plurality of terminal stations 3 and measure communication states. Then, in the wireless communication system 1 (1a, 1b, 1c), the mobile relay station 2 (2a, 2b, 2c) changes the scanning speed of the beam on the basis of the congestion degree state based on the measured communication state and the position information indicating the position of each terminal station 3 included in the terminal uplink signal. Then, the mobile relay station 2 (2a, 2b, 2c) is configured to permit transmission of the terminal uplink signal by the terminal station 3 by using the beam made into a spot for each of the divided small areas.

That is, in the wireless communication system 1 (1a, 1b, 1c) according to the first embodiment and the second embodiment described above, the mobile relay station 2 (2a, 2b, 2c) is configured to control the transmission timing of the terminal uplink signal by the terminal station 3. On the other hand, in the wireless communication system 1d according to the present embodiment, each terminal station 3d located in the emission range 301 of the beam is configured to autonomously control the transmission timing of the terminal uplink signal.

Figure 16:
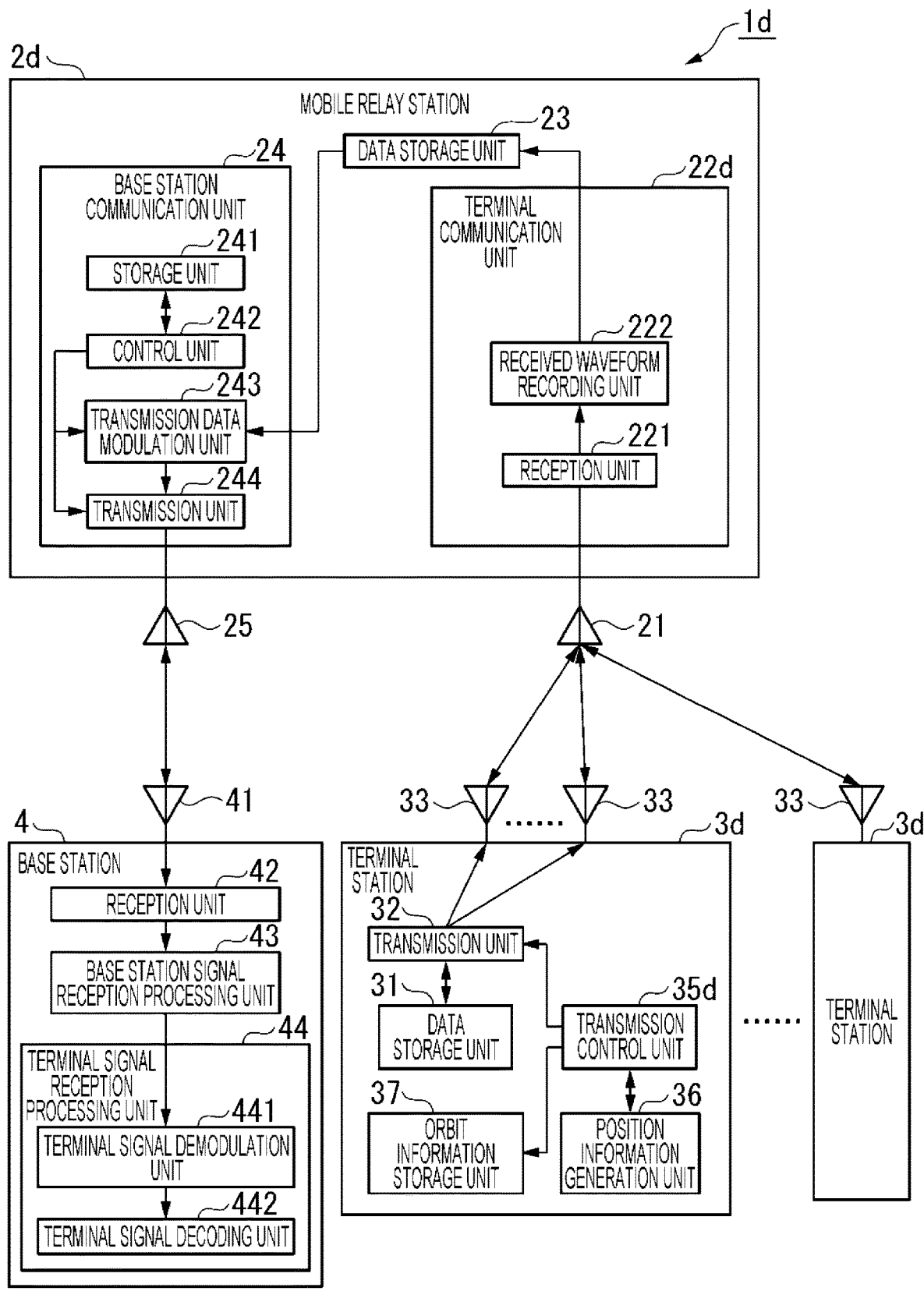
FIG. 16 is a configuration diagram of a wireless communication system according to a third embodiment of the present invention.

FIG. 16 is a configuration diagram of the wireless communication system 1d according to the third embodiment. In the figure, the same components as those of the wireless communication system 1 in the first embodiment illustrated in FIG. 1 are denoted by the same reference numerals, and the description thereof will be omitted.

As illustrated in FIG. 16, the wireless communication system 1d includes a mobile relay station 2d, a terminal station 3d, and the base station 4. The number of mobile relay stations 2d, the number of terminal stations 3d, and the number of base stations 4 included in the wireless communication system 1d are arbitrary, but it is assumed that the number of terminal stations 3d is large. The wireless communication system 1d is a communication system that transmits information for which immediacy is not required. Pieces of information respectively transmitted from a plurality of the terminal stations 3d are transmitted via the mobile relay station 2d and collected by the base station 4.

The mobile relay station 2d is an example of a relay device that is mounted on a mobile body and whose communicable area moves with a lapse of time. The mobile relay station 2d is included in, for example, an LEO satellite. The altitude of the LEO satellite orbits above the earth. The terminal station 3d and the base station 4 are installed on the earth such as on the ground or on the sea. The plurality of terminal stations 3d exists at different places. The terminal station 3d is, for example, an IoT terminal. The terminal station 3d collects data such as environmental data detected by a sensor and transmits the collected data to the mobile relay station 2d by a wireless signal. In the figure, only two terminal stations 3d are illustrated. The mobile relay station 2d receives data transmitted from each of the plurality of terminal stations 3d by a wireless signal while moving above the earth. The mobile relay station 2d accumulates the received data and wirelessly transmits the accumulated data collectively to the base station 4 at a timing at which communication with the base station 4 is possible. The base station 4 receives the data collected by the terminal station 3d from the mobile relay station 2d.

As the mobile relay station 2d, it is conceivable to use a relay station mounted on a geostationary orbit satellite or an unmanned aerial vehicle such as a drone or a HAPS, but in the present embodiment, it is assumed that the mobile relay station 2d is mounted on a LEO satellite. Since the mobile relay station 2d mounted on the LEO satellite performs communication while moving at high speed, a time during which each of the terminal stations 3d or the base station 4 can communicate with the mobile relay station 2d is limited. The mobile relay station 2d receives a terminal uplink signal from the terminal station 3d within coverage at a current position during movement, and stores waveform data of the received terminal uplink signal.

The mobile relay station 2d wirelessly transmits a base station downlink signal including the waveform data of the terminal uplink signal to the base station 4 at a timing when the base station 4 exists in the coverage. The base station 4 demodulates the base station downlink signal received from the mobile relay station 2d to obtain the waveform data of the terminal uplink signal. The base station 4 demodulates and decodes the terminal uplink signal represented by the waveform data to obtain terminal transmission data that is data transmitted by the terminal station 3d.

Note that, in the wireless communication system 1d according to the present embodiment, it is assumed that the mobile relay station 2d and the terminal station 3d are configured to perform wireless communication using LPWA as an example. Each terminal station 3d may be configured to transmit the same terminal uplink signal toward the mobile relay station 2d a plurality of times to ensure reliability of communication.

Further, as described above, it is assumed that the number of terminal stations 3d is large. With such a configuration, there is a case where the amount of communication of data transmitted from the terminal stations 3d to the mobile relay station 2d increases, and a communication band is tight. The wireless communication system 1d according to the present embodiment controls a transmission timing in transmission of data from the terminal station 3d to the mobile relay station 2d to prevent tightness of the communication band. Control of the transmission timing is performed autonomously in each terminal station 3d on the basis of an orbit of the mobile relay station 2d and a position where the terminal station 3d exists.

Specifically, each terminal station 3d stores in advance information (Hereinafter, it is referred to as "orbit information".) indicating the orbit of the mobile relay station 2d. In addition, the terminal station 3d includes, for example, a positioning device such as a GPS receiver, and can generate position information indicating a position of the terminal station 3d and clock a current time.

The terminal station 3d specifies a time zone (Hereinafter, it is referred to as a "communicable time zone".) in which communication with the mobile relay station 2d is enabled, on the basis of the orbit information and the position information indicating the position of the terminal station 3d. The terminal station 3d determines a time (Hereinafter, it is referred to as "transmission start time".) at which transmission of the terminal uplink signal to the mobile relay station 2d is started, on the basis of the specified communicable time zone. The terminal station 3d clocks the current time, and starts transmission of the terminal uplink signal to the mobile relay station 2d at a timing when the transmission start time comes.

Here, the mobile relay station 2d determines, for example, a time randomly selected from the communicable time zone as the transmission start time. As a result, even in a case where a large number of terminal stations 3d exist at positions close to each other, transmission of terminal uplink signals from the large number of terminal stations 3d to the mobile relay station 2d can be prevented from being simultaneously started. As a result, the wireless communication system 1d according to the present embodiment can prevent tightness of the communication band of communication in the mobile relay station 2d.

Note that the terminal station 3d may determine, as the transmission start time, a time calculated on the basis of the position (for example, latitude and longitude) of the terminal station 3d obtained by the positioning device and a predetermined calculation rule, for example, instead of determining the time randomly selected from the communicable time zone as the transmission start time.

A configuration of each device will be described.

As illustrated in FIG. 16, the mobile relay station 2d includes the antenna 21, a terminal communication unit 22d, the data storage unit 23, the base station communication unit 24, and the antenna 25.

The terminal communication unit 22d includes the reception unit 221 and the received waveform recording unit 222. The reception unit 221 receives a terminal uplink signal through the antenna 21. The received waveform recording unit 222 samples a received waveform of the terminal uplink signal received by the reception unit 221, and generates waveform data indicating a value obtained by the sampling. The received waveform recording unit 222 writes received waveform information including a reception time of the terminal uplink signal in the antenna 21 and the generated waveform data in the data storage unit 23. The data storage unit 23 stores the received waveform information written by the received waveform recording unit 222. Configurations of the base station communication unit 24 of the mobile relay station 2d and the base station 4 are similar to the configurations of the base station communication unit 24 of the mobile relay station 2 and the base station 4 of the wireless communication system 1 according to the first embodiment described above.

The terminal station 3d includes the data storage unit 31, the transmission unit 32, one or the plurality of antennas 33, a transmission control unit 35d, the position information generation unit 36, and an orbit information storage unit 37. The data storage unit 31 stores sensor data and the like. The transmission unit 32 reads the sensor data from the data storage unit 31 as terminal transmission data, and transmits the terminal uplink signal including the read terminal transmission data from the antenna 33 by a wireless signal. The transmission unit 32 transmits the signal by LPWA, for example. The transmission unit 32 determines a channel and a transmission timing to be used for transmission of a terminal uplink signal by the terminal station 3d by a method determined in advance in a wireless communication scheme to be used. In addition, the transmission unit 32 may perform beam formation of signals transmitted from the plurality of antennas 33 by the method determined in advance in the wireless communication scheme to be used.

The orbit information storage unit 37 stores in advance information (orbit information) indicating the orbit of the mobile relay station 2d. The position information generation unit 36 includes a positioning device such as a GPS receiver, for example, and specifies the position of the terminal station 3d. The position information generation unit 36 generates position information indicating the specified position of the terminal station 3d. The transmission control unit 35d specifies a time zone (communicable time zone) in which communication between the transmission unit 32 and the mobile relay station 2d is enabled, on the basis of the orbit information stored in the orbit information storage unit 37 and the position information indicating the position of the terminal station 3d specified by the position information generation unit 36. The transmission control unit 35d determines a time (transmission start time) at which transmission of the terminal uplink signal to the mobile relay station 2d is started on the basis of the specified communicable time zone. The transmission start time is determined within a range of the communicable time zone. The transmission control unit 35d clocks the current time, and controls the transmission unit 32 to start transmission of the terminal uplink signal to the mobile relay station 2d at the timing when the transmission start time comes. The transmission unit 32 starts transmission of the terminal uplink signal to the mobile relay station 2d under the control of the transmission control unit 35d.

As described above, the mobile relay station 2d determines, for example, a time randomly selected within the range of the communicable time zone as the transmission start time. The mobile relay station 2d scans the communication target area with the beam, depending on the transmission start time. As a result, the wireless communication system 1d according to the present embodiment can prevent tightness of the communication band of communication in the mobile relay station 2d. Note that the terminal station 3d may determine, for example, the time calculated on the basis of the position (for example, latitude and longitude) of the terminal station 3d obtained by the positioning device and a predetermined calculation rule as the transmission start time.

Operation of the terminal station 3d will be described.

Figure 17:
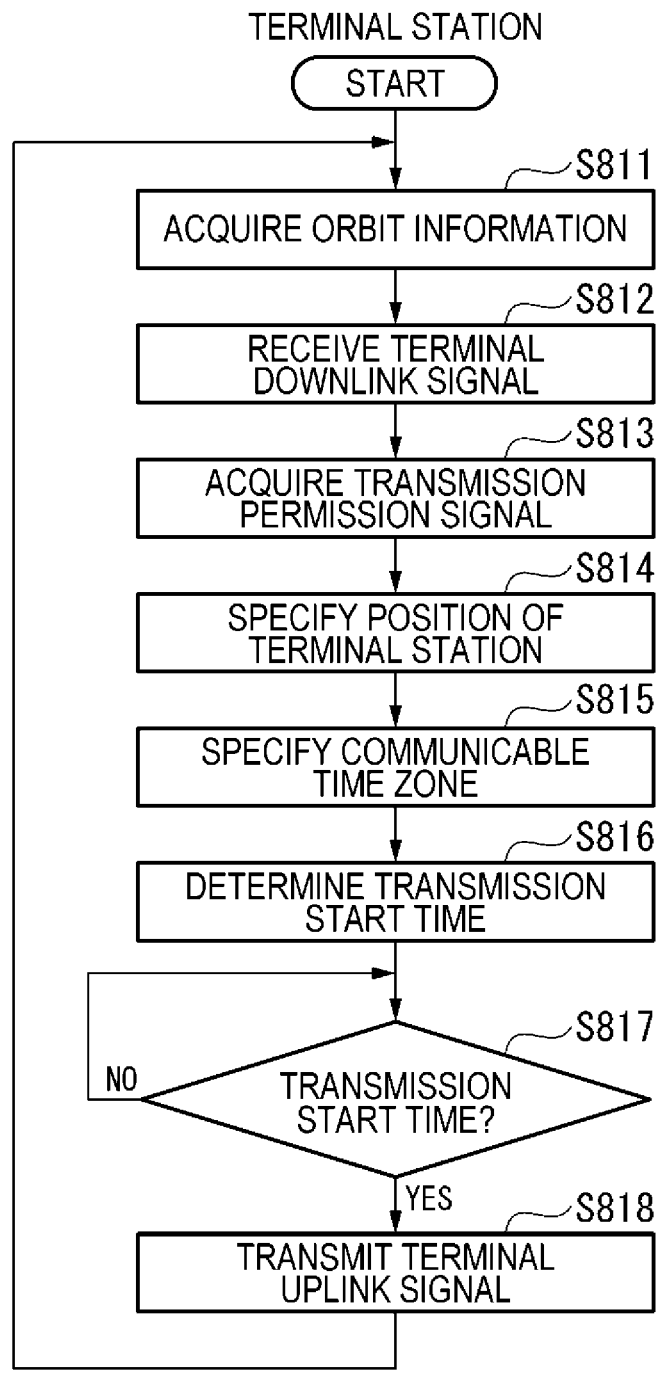
FIG. 17 is a flow diagram illustrating transmission control processing performed by the wireless communication system according to the embodiment.

FIG. 17 is a flow diagram illustrating terminal uplink signal transmission timing control processing performed by the terminal station 3d.

The transmission control unit 35d of the terminal station 3d acquires the orbit information stored in the orbit information storage unit 37 (step S811). The reception unit 34 of the terminal station 3 receives the terminal downlink signal through the antenna 33 (step S812). The transmission control unit 35 of the terminal station 3 acquires the transmission permission signal from the terminal downlink signal received by the reception unit 34 (step S813).

The position information generation unit 36 of the terminal station 3d specifies the position of the terminal station 3d with a positioning device, for example, a GPS receiver or the like (step S814). The position information generation unit 36 generates position information indicating the specified position of the terminal station 3d. The transmission control unit 35d specifies a time zone (communicable time zone) in which communication between the transmission unit 32 and the mobile relay station 2d is enabled on the basis of the orbit information and the position information generated by the position information generation unit 36 (step S815). The transmission control unit 35d determines a time (transmission start time) at which transmission of the terminal uplink signal to the mobile relay station 2d is started on the basis of the specified communicable time zone (step S816).

The transmission control unit 35d clocks the current time and waits until the current time reaches the transmission start time (step S817: No). In a case where the current time reaches the transmission start time within the time during which the terminal station 3d is located in the emission range 301 (step S817: Yes), the transmission control unit 35d controls the transmission unit 32 to start transmission of the terminal uplink signal to the mobile relay station 2d. The transmission unit 32 starts transmission of the terminal uplink signal to the mobile relay station 2d (step S818).

The terminal station 3d repeats the processing of step S811 and subsequent steps.

As described above, in the wireless communication system 1d according to the third embodiment, each terminal station 3d autonomously controls the transmission timing of the terminal uplink signal. Each terminal station 3d specifies the communicable time zone of communication with the mobile relay station 2d on the basis of the orbit information indicating the orbit of the mobile relay station 2d and the position information indicating the position of the terminal station 3d. The terminal station 3d determines the transmission start time of the terminal uplink signal on the basis of the specified communicable time zone. At this time, the terminal station 3d randomly determines the transmission start time within the range of the communicable time zone, for example.

With such a configuration, the wireless communication system 1d according to the third embodiment can implement wide coverage without increasing the number of beams more than necessary. The wireless communication system 1d can reduce the congestion degree of communication in the mobile relay station 2d. As a result, the wireless communication system 1d can suppress a decrease in reliability of communication even in a case where the congestion degree of communication fluctuates.

Modification 1 of Third Embodiment

In a case where there is a plurality of the mobile relay stations 2d, the following configuration is also conceivable.

The terminal station 3d stores in advance correspondence information in which a specific mobile relay station 2d is associated with each area (for example, the small area described above). The terminal station 3d specifies the position of the terminal station 3d, thereby recognizing an area including the specified position of the terminal station 3d. The terminal station 3d refers to the correspondence information, thereby specifying the mobile relay station 2d corresponding to the area including the position of the terminal station 3d. The terminal station 3d transmits the terminal uplink signal to the specified mobile relay station 2d.

At this time, the terminal station 3d specifies the communicable time zone of communication with the mobile relay station 2d on the basis of the orbit information on the specified mobile relay station 2d and the position information indicating the position of the terminal station 3d. The terminal station 3d determines the transmission start time of the terminal uplink signal to the mobile relay station 2d within the specified communicable time zone. At this time, the terminal station 3d randomly determines the transmission start time within the range of the communicable time zone, for example.

As described above, with such a configuration, the wireless communication system 1d according to the present modification can implement wide coverage without increasing the number of beams more than necessary. The wireless communication system 1d can reduce the congestion degree of communication in the mobile relay station 2d. As a result, the wireless communication system 1d can suppress a decrease in reliability of communication even in a case where the congestion degree of communication fluctuates.

Modification 2 of Third Embodiment

In a case where a signal from which position information can be estimated, for example, a beacon or the like (Hereinafter, the signal is referred to as a "beacon or the like".) can be transmitted from the mobile relay station 2d to the terminal station 3d, the following configuration is also conceivable.

The mobile relay station 2d transmits the beacon or the like toward the ground at predetermined intervals, for example. In a case where the beacon or the like transmitted from the mobile relay station 2d is received, each terminal station 3d estimates the position of the mobile relay station 2d on the basis of the beacon or the like. The terminal station 3d corrects the orbit information on the mobile relay station 2d stored in the orbit information storage unit 37 on the basis of the estimated position of the mobile relay station 2d and the current time.

The terminal station 3d specifies the communicable time zone of communication with the mobile relay station 2d on the basis of the corrected orbit information and the position information indicating the position of the terminal station 3d. In a case where the terminal station 3d is located in the emission range 301 of the beam made into a spot, the terminal station 3d determines the transmission start time of the terminal uplink signal on the basis of the specified communicable time zone. At this time, the terminal station 3d randomly determines the transmission start time within the range of the communicable time zone, for example.

As described above, with such a configuration, the wireless communication system according to the present modification can further improve accuracy in calculation of the communicable time zone of communication between the mobile relay station 2d and each terminal station 3d.

According to the above-described embodiments and modifications thereof, in a wireless communication system, a relay device (movable relay device) included in a mobile body and a plurality of communication devices existing at different places wirelessly communicate with each other. For example, the relay device is the mobile relay station 2, 2a, 2b, 2c, or 2d in the embodiments, the first communication device is the terminal station 3 in the embodiments, and the second communication device is the base station 4 in the embodiments.

The relay device includes a relay device reception unit, a measuring unit, a relay device control unit, and a relay device transmission unit. For example, the relay device reception unit is a set of the antenna 21 and the reception unit 221 or 221b in the embodiments, the measuring unit is the communication state measuring unit 223 or 223b in the embodiments, the relay device control unit is the area control unit 224 or 224b in the embodiments, and the relay device transmission unit is a set of the antenna 21 and the transmission unit 226 or 226b.

The relay device reception unit receives signals transmitted from a plurality of communication devices and including position information indicating positions of the communication devices. For example, the signals are terminal uplink signals in the embodiments. The measuring unit measures a congestion degree of communication in the relay device reception unit. The relay device control unit divides a communication target area into a plurality of small areas on the basis of the positions of the plurality of communication devices and the congestion degree of communication, and generates area information indicating a position of each small area. The relay device transmission unit sequentially transmits a plurality of pieces of area information when the relay device is located in a range where the relay device is communicable with the communication device.

The communication device includes a storage unit, a communication device reception unit, a communication device control unit, and a communication device transmission unit. For example, the storage unit is the data storage unit 31 in the embodiments, the communication device reception unit is a set of the antenna 33 and the reception unit 34 in the embodiments, the communication device control unit is the transmission control unit 35 in the embodiments, and the communication device transmission unit is a set of the antenna 33 and the transmission unit 32 in the embodiments.

The storage unit stores transmission data to be transmitted to the relay device. For example, the transmission data is data such as environmental data in the embodiments. The communication device reception unit receives the area information. The communication device control unit determines whether or not the position of the communication device is included in the small area based on the area information. In a case where the position of the communication device is included in the small area, the communication device transmission unit transmits a signal including the transmission data and the position information indicating the position of the communication device to the relay device. For example, the signal is a terminal uplink signal in the embodiments.

Note that the relay device control unit may divide the communication target area into a plurality of small areas in which the congestion degrees of communication are made uniform.

Note that the congestion degree of communication may be information indicating the number of accesses of the signal per unit time in the relay device reception unit or information indicating the received signal strength of the signal. For example, the signal is a terminal uplink signal in the embodiments.

Note that the relay device may be included in a mobile body orbiting the earth, and the relay device transmission unit may transmit area information generated in the previous orbiting to the communication device.

Note that the mobile body may be a low earth orbit satellite, the communication device may be included in a terminal device including a sensor, and the signal may be a signal indicating sensor data measured by the terminal device.

Note that the wireless communication system may further include a base station device that wirelessly communicates with the relay device. For example, the base station device is the base station 4 in the embodiments. The relay device may transmit signals based on signals respectively transmitted from the plurality of communication devices to the base station device when the relay device is located in a range where the relay device is communicable with the base station device. For example, signals based on signals respectively transmitted from the plurality of communication devices are base station downlink signals in the embodiments.

In addition, according to the above-described embodiments and modifications thereof, a communication device that wirelessly communicates with a relay device included in a mobile body includes a storage unit, a control unit, and a transmission unit. For example, the storage unit is a set of the data storage unit 31 and the orbit information storage unit 37 in the embodiments, the control unit is the transmission control unit 35*d* in the embodiments, and the transmission unit is a set of the antenna 33 and the transmission unit 32 in the embodiments.

The storage unit stores transmission data to be transmitted to the relay device and orbit information indicating an orbit of the mobile body. For example, the transmission data is data such as environmental data in the embodiments. The control unit specifies the communicable time zone that is a time zone in which communication with the relay device is possible on the basis of the orbit information and the position of the communication device. The transmission unit transmits the transmission data to the relay device in the communicable time zone.

Note that the transmission unit may transmit the transmission data at a randomly determined time within a range of the communicable time zone.

Note that, in the first to third embodiments and modifications thereof, a case has been described where the mobile body on which the mobile relay station is mounted is an LEO satellite; however, the mobile body may be another flying object that flies in the sky, such as a geostationary orbit satellite, a drone, or a HAPS.

Figure 18:
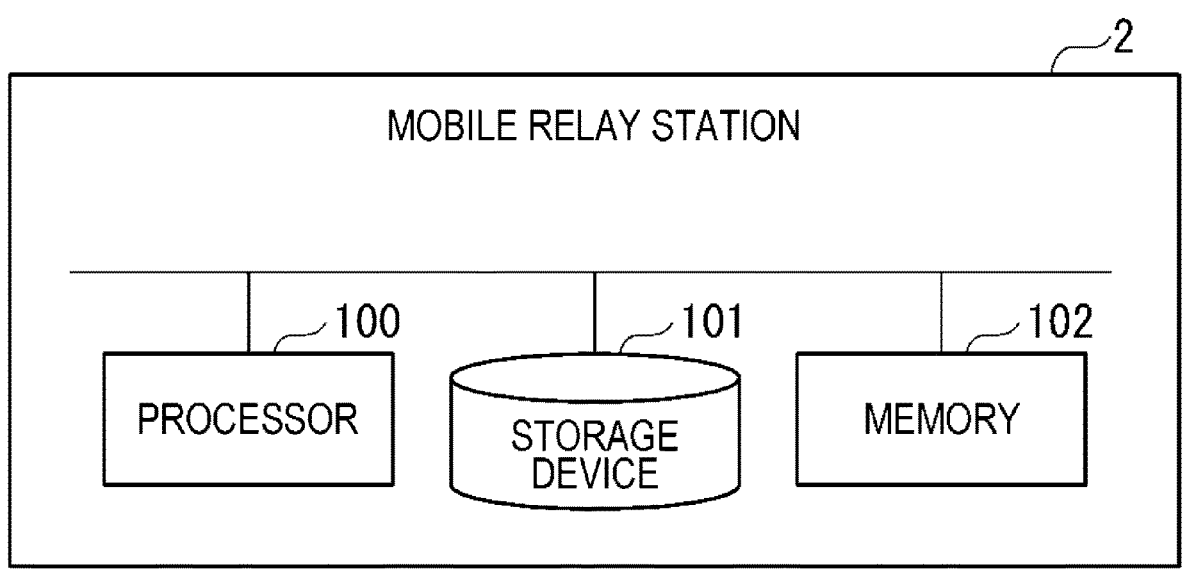
FIG. 18 is a diagram illustrating a hardware configuration example of a functional unit of a mobile relay station according to the embodiments.

FIG. 18 is a diagram illustrating a hardware configuration example of a functional unit of the mobile relay station 2 according to the embodiments. A part of the mobile relay stations 2, 2*a*, 2*b*, 2*c*, and 2*d*, the terminal stations 3 and 3*d*, and the base stations 4, 4*a*, and 4*b* in the above-described embodiments may be implemented by a computer. In that case, a program for implementing functions of those may be recorded in a computer-readable recording medium, and the program recorded in the recording medium may be read and executed by a computer system to implement the functions. Note that the "computer system" mentioned herein includes an OS and hardware such as a peripheral device. In addition, the "computer-readable recording medium" refers to a portable medium such as a flexible disk, a magneto-optical disk, a ROM, or a CD-ROM, or a storage device such as a hard disk built in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. In addition, the above program may be for implementing some of the functions described above, may be one that can implement the functions described above in combination with a program already recorded in the computer system, or may be one implemented by using a programmable logic device such as a field programmable gate array (FPGA).

That is, some or all of functional units of the wireless communication system are implemented as software by a processor 100 such as a central processing unit (CPU) executing a program stored in a memory 102 including a nonvolatile recording medium (non-transitory recording medium). The program may be recorded on the computer-readable recording medium. The computer-readable recording medium is, for example, a portable medium such as a flexible disk, a magneto-optical disk, a read only memory (ROM), or a compact disc read only memory (CD-ROM), or a non-transitory recording medium such as a storage device 101 such as a hard disk built in the computer system. Some or all of the functional units of the wireless communication system may be implemented by using hardware including an electronic circuit (electronic circuit or circuitry) using, for example, a large scale integrated circuit (LSI), an application specific integrated circuit (ASIC), a programmable logic device (PLD), a field programmable gate array (FPGA), or the like.

Although the embodiments of the present invention have been described in detail with reference to the drawings, specific configurations are not limited to the embodiments, and include design and the like within the scope of the present invention without departing from the gist of the present invention.

REFERENCE SIGNS LIST

1, 1*a*, 1*b*, 1*c*, 1*d* wireless communication system
2, 2*a*, 2*b*, 2*c*, 2*d* mobile relay station
3, 3*d* terminal station
4, 4*a*, 4*b* base station
21, 21-1 to 21-N antenna
22, 22*b*, 22*c*, 22*d* terminal communication unit
23 data storage unit
24 base station communication unit
25 antenna
26 base station communication unit
27 inter-relay station communication unit
28 antenna
31 data storage unit
32 transmission unit
33 antenna
34 reception unit
35, 35*d* transmission control unit
36 position information generation unit
41 antenna
42 reception unit
43 base station signal reception processing unit
44 terminal signal reception processing unit
100 processor
101 storage device
102 memory
221, 221*b*, 221*b*-1 to 221*b*-N reception unit
222, 222*b*, 222*b*-1 to 222*b*-N received waveform recording unit
223, 223*b* communication state measuring unit
224, 224*b* area control unit
225 storage unit
226, 226*b* transmission unit
227, 227*b* position information acquisition unit
228 antenna drive unit
241 storage unit
242 control unit
243 transmission data modulation unit
244 transmission unit
261 storage unit
262 control unit
263 transmission data modulation unit
264 MIMO transmission unit
300 communication target area
301 emission range
410 antenna station
420 MIMO reception unit
430 base station signal reception processing unit 441 terminal signal demodulation unit
442 terminal signal decoding unit
450 terminal signal reception processing unit
451 distribution unit
452, 452-1 to 452-N terminal signal demodulation unit
453 combining unit
454 terminal signal decoding unit

The invention claimed is:

1. A wireless communication system comprising: one or more first communication devices located in one or more small areas among a plurality of small areas into which a communication target area is divided; a relay device; and a second communication device, wherein
the relay device includes:
an antenna driver that drives one or more antennas to scan the plurality of small areas with one or more beams while emitting the beams to the communication target area, the beams each having an emission range narrower than the communication target area;
a receptor that acquires, from the antennas, a first wireless signal transmitted from the first communication devices located in the emission range;
a transmitter that transmits a second wireless signal depending on the first wireless signal to the second communication devices; and
a communication state measurer that derives a congestion degree of communication on a basis of a transmission frequency of the first wireless signal,
wherein
the communication state measurer that predicts the congestion degree of the relay device in the next orbiting by using the position information on the first communication devices in the current orbiting, and
the antenna driver drives the antennas to scan an inside of the communication target area with the beams at a scanning speed depending on the predicted congestion degree during the next orbiting.

2. The wireless communication system according to claim 1, wherein the antenna driver drives the antennas to reduce the scanning speed in a case where the congestion degree is greater than or equal to a threshold, and drives the antennas to increase the scanning speed in a case where the congestion degree is less than the threshold.

3. The wireless communication system according to claim 1, wherein the antenna driver drives the antennas to scan the plurality of small areas with the one or more beams in a state where the emission ranges are separated from each other.

4. A wireless communication method executed by a wireless communication system including: one or more first communication devices located in one or more small areas among a plurality of small areas into which a communication target area is divided; a relay device; and a second communication device,
the wireless communication method comprising,
by the relay device:
driving one or more antennas to scan the plurality of small areas with one or more beams while emitting the beams to the communication target area, the beams each having an emission range narrower than the communication target area;
acquiring, from the antennas, a first wireless signal transmitted from the first communication devices located in the emission range; and
transmitting a second wireless signal depending on the first wireless signal to the second communication device; and
deriving a congestion degree of communication on a basis of a transmission frequency of the first wireless signal,
wherein
deriving a congestion degree of communication comprises predicting the congestion degree of the relay device in the next orbiting by using the position information on the first communication devices in the current orbiting, and
deriving one or more antennas comprises driving the antennas to scan an inside of the communication target area with the beams at a scanning speed depending on the predicted congestion degree during the next orbiting.

5. A non-transitory computer readable medium storing a program for causing a computer to function as the relay device of the wireless communication system according to claim 1.

* * * * *